United States Patent
Sitter et al.

(10) Patent No.: US 11,402,637 B2
(45) Date of Patent: Aug. 2, 2022

(54) HEADSET AND HEAD-MOUNTED DISPLAY

(71) Applicant: 3M INNOVATIVE PROPERTIES COMPANY, St. Paul, MN (US)

(72) Inventors: Brett J. Sitter, Cottage Grove, MN (US); Zhaohui Yang, North Oaks, MN (US); James A. Thielen, Hugo, MN (US); Byoung Kyu Kim, Busan (KR)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 17/043,070

(22) PCT Filed: Apr. 18, 2019

(86) PCT No.: PCT/IB2019/053243
§ 371 (c)(1),
(2) Date: Sep. 29, 2020

(87) PCT Pub. No.: WO2019/202554
PCT Pub. Date: Oct. 24, 2019

(65) Prior Publication Data
US 2021/0026143 A1 Jan. 28, 2021

Related U.S. Application Data

(60) Provisional application No. 62/660,569, filed on Apr. 20, 2018.

(51) Int. Cl.
*G02B 27/01* (2006.01)
*G02B 27/42* (2006.01)

(52) U.S. Cl.
CPC ..... *G02B 27/0172* (2013.01); *G02B 27/4233* (2013.01)

(58) Field of Classification Search
CPC ............ G02B 27/0172; G02B 27/4233; G02B 27/0103; G02B 2027/0132; G02B 2027/0143; G02B 2027/0174
See application file for complete search history.

(56) References Cited

U.S. PATENT DOCUMENTS

| | | | |
|---|---|---|---|
| 4,374,077 A | 2/1983 | Kerfeld | |
| 4,576,850 A | 3/1986 | Martens | |

(Continued)

FOREIGN PATENT DOCUMENTS

| | | |
|---|---|---|
| CN | 106020431 | 6/2016 |
| WO | WO 2000-048037 | 8/2000 |
| WO | WO 2015-191949 | 12/2015 |

OTHER PUBLICATIONS

International Search report for PCT International Application No. PCT/IB2019/053243 dated Aug. 5, 2019, 4 pages.

*Primary Examiner* — Ricardo Osorio
(74) *Attorney, Agent, or Firm* — Clifton F. Richardson

(57) ABSTRACT

Headsets and head-mounted displays including first and second diffractive elements are described. In some cases, the first and second diffractive elements include first and second grating surfaces, and for at least one wavelength, the first and second grating surfaces have at least one different corresponding diffractive property. The head-mounted display may include two-dimensionally pixelated adjacent first and second display surfaces for displaying images, and first and second diffractive elements disposed adjacent the respective first and second display surfaces. In some cases, the first diffractive element is configured to diffract a first wavelength λ1, but not a different second wavelength λ2, into zero and first diffraction orders having intensities within 5% of each other, and the second diffractive element is configured to diffract the second wavelength λ2, but not the (Continued)

first wavelength λ1, into zero and first diffraction orders having intensities within 5% of each other.

20 Claims, 15 Drawing Sheets

(56) References Cited

U.S. PATENT DOCUMENTS

| | | | |
|---|---|---|---|
| 5,175,030 A | 12/1992 | Lu | |
| 5,183,597 A | 2/1993 | Lu | |
| 5,271,968 A | 12/1993 | Coyle | |
| 5,558,740 A | 9/1996 | Bernard | |
| 5,864,326 A | 1/1999 | Rallison | |
| 5,995,690 A | 11/1999 | Kotz | |
| 6,134,051 A | 10/2000 | Hayakawa | |
| 7,140,812 B2 | 11/2006 | Bryan | |
| 7,328,638 B2 | 2/2008 | Gardiner | |
| 7,350,442 B2 | 4/2008 | Ehnes | |
| 9,513,480 B2 * | 12/2016 | Saarikko | G02B 5/1861 |
| 9,557,568 B1 | 1/2017 | Ouderkirk | |
| 9,640,120 B2 | 5/2017 | Petrov | |
| 9,827,209 B2 * | 11/2017 | Kostamo | G01N 33/6896 |
| 10,018,844 B2 * | 7/2018 | Levola | G02B 6/00 |
| 10,281,725 B2 * | 5/2019 | Yokoyama | G02B 6/124 |
| 10,317,677 B2 * | 6/2019 | Levola | G02B 27/0081 |
| 10,976,555 B1 * | 4/2021 | Chi | G02B 6/0016 |
| 11,016,241 B2 * | 5/2021 | Wang | G02B 5/1819 |
| 11,086,216 B2 * | 8/2021 | Kostamo | G02B 5/1857 |
| 11,169,314 B2 * | 11/2021 | Popovich | G02B 27/0103 |
| 2013/0038935 A1 | 2/2013 | Moussa et al. | |
| 2013/0083040 A1 | 4/2013 | Prociw | |
| 2013/0265623 A1 * | 10/2013 | Sugiyama | G02B 27/0103 359/13 |
| 2014/0049451 A1 * | 2/2014 | Sugiyama | G02B 27/01 345/8 |
| 2015/0253574 A1 | 9/2015 | Thurber | |
| 2015/0260994 A1 | 9/2015 | Akutsu et al. | |
| 2015/0277117 A1 | 10/2015 | Yamada et al. | |
| 2016/0016338 A1 | 1/2016 | Radcliffe | |
| 2016/0127717 A1 | 5/2016 | Petrov | |
| 2016/0178907 A1 | 6/2016 | Chang | |
| 2016/0231566 A1 * | 8/2016 | Levola | G02F 1/0136 |
| 2017/0115498 A1 | 4/2017 | Sitter | |
| 2017/0131552 A1 * | 5/2017 | Yokoyama | G02B 5/1866 |
| 2017/0131559 A1 | 5/2017 | Sitter | |
| 2017/0276957 A1 * | 9/2017 | Matsuki | G02B 27/4272 |
| 2018/0005563 A1 | 1/2018 | Lee et al. | |
| 2018/0172994 A1 * | 6/2018 | Robbins | G02B 26/0833 |

* cited by examiner

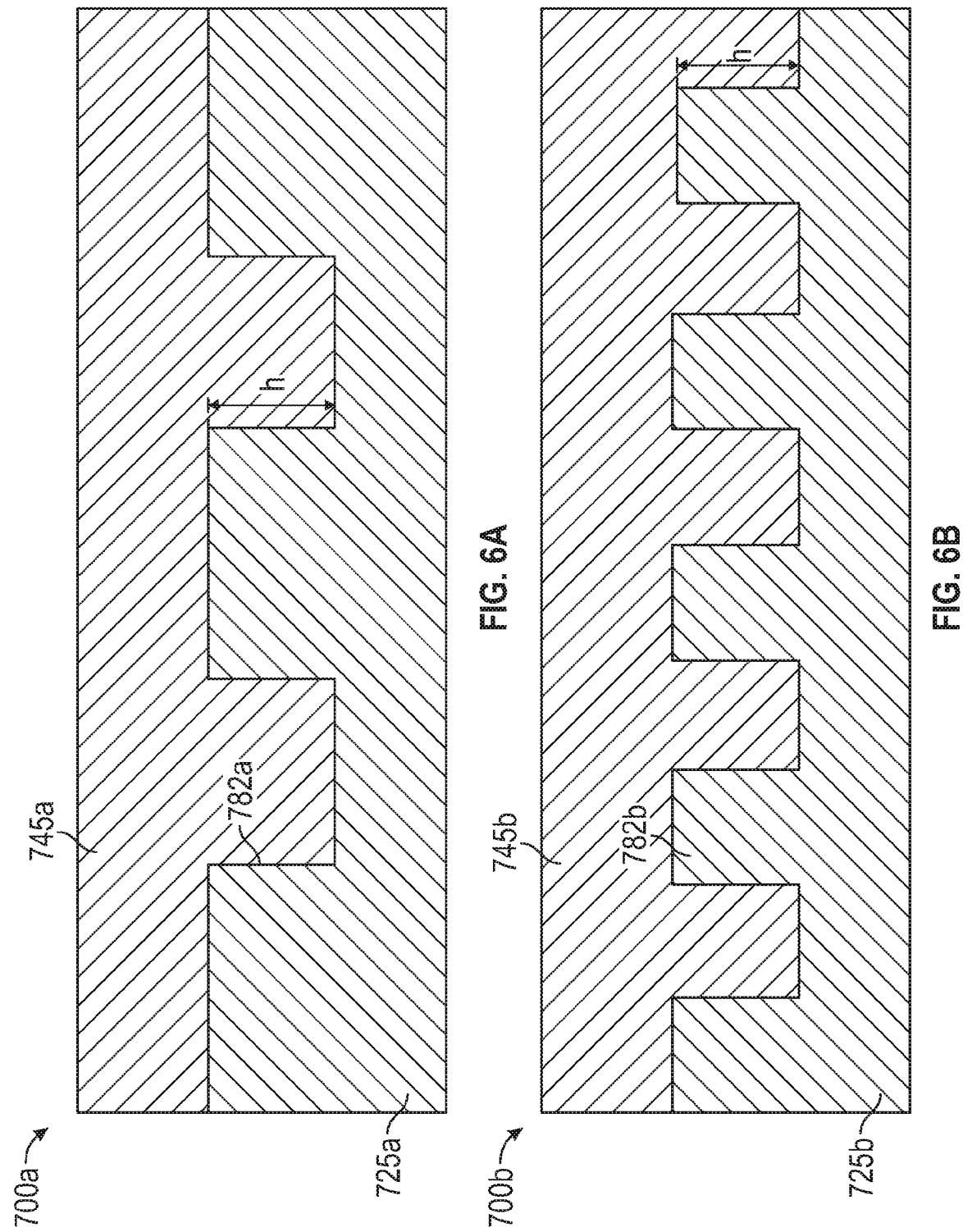

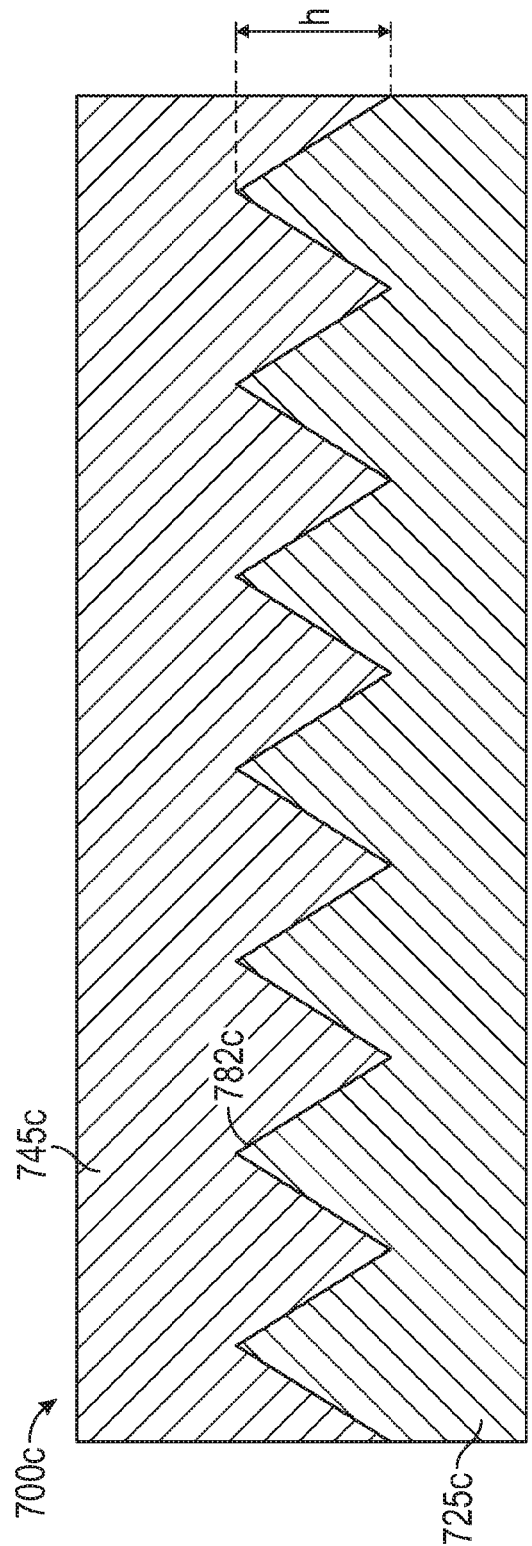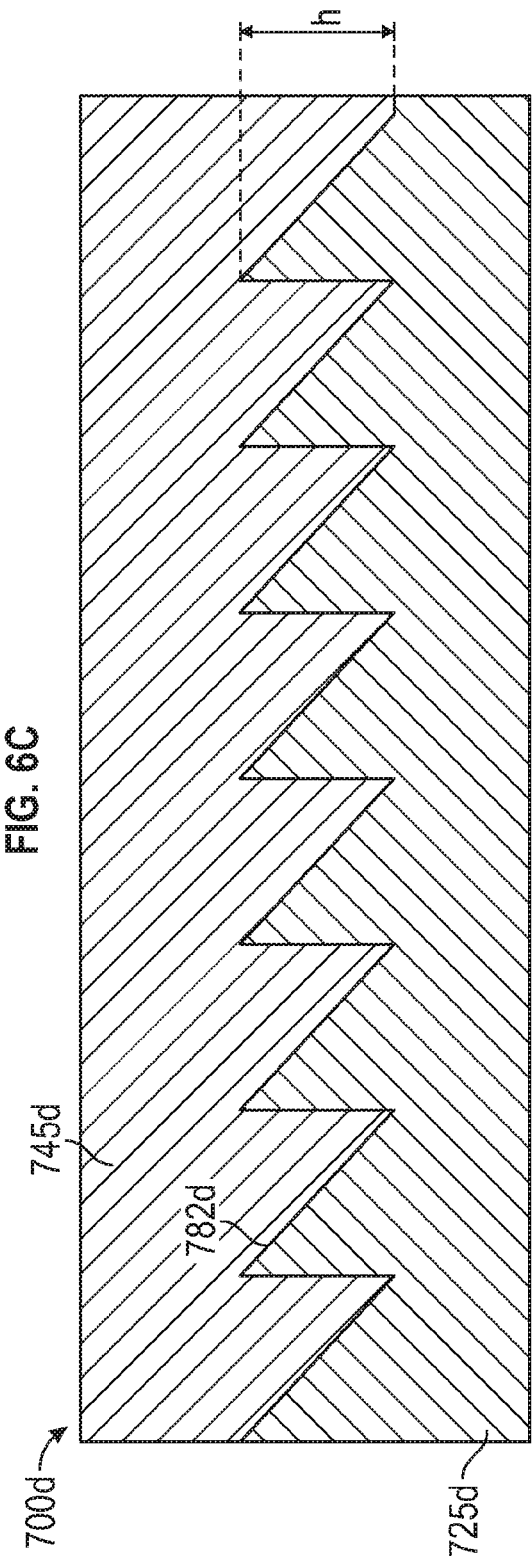

HEADSET AND HEAD-MOUNTED DISPLAY

CROSS REFERENCE TO RELATED APPLICATIONS

This application is a national stage filing under 35 U.S.C. 371 of PCT/IB2019/053243, filed Apr. 18, 2019, which claims the benefit of U.S. Provisional Patent Application No. 62/660,569, filed Apr. 20, 2018, the disclosures of which are incorporated by reference in their entirety herein.

BACKGROUND

Pixelated displays typically have gaps between adjacent pixels and subpixels. In some cases, these gaps result in optical artifacts known as the screen-door effect which may be objectionable to viewers.

SUMMARY

In some aspects of the present description, a head-mounted display including two-dimensionally pixelated adjacent first and second display surfaces for displaying images, and first and second diffractive elements disposed adjacent the respective first and second display surfaces is provided. The first diffractive element is configured to diffract a first wavelength $\lambda 1$, but not a different second wavelength $\lambda 2$, into zero and first diffraction orders having intensities within 5% of each other, and the second diffractive element is configured to diffract the second wavelength $\lambda 2$, but not the first wavelength $\lambda 1$, into zero and first diffraction orders having intensities within 5% of each other.

In some aspects of the present description, a head-mounted display including pixelated first and second display surfaces, and non-overlapping first and second diffractive elements substantially co-extensive with the respective first and second display surfaces is provided. For at least one wavelength, the first and second diffractive elements have at least one different corresponding diffractive property.

In some aspects of the present description, a head-mounted display including left and right pixelated display surfaces for displaying images to respective left and right eyes of a viewer, and left and right grating surfaces substantially co-extensive with the respective left and right display surfaces is provided. For at least one wavelength, the first and second grating surfaces have at least one different corresponding diffractive property.

In some aspects of the present description, a head-mounted display including a first display surface for displaying an image; a second display surface for displaying an image, the second display surface disposed proximate the first display surface; a first multilayer optical film disposed adjacent the first display surface; and a second multilayer optical film disposed adjacent the second display surface is provided. The first multilayer optical film includes first and second optical layers defining a two-dimensional first grating interface therebetween. The first and second optical layers have respective different first and second refractive indices n1 and n2. The first grating interface has a grating height h1. At a reference wavelength $\lambda$, the first multilayer optical film has an average value of $|n1-n2|*h1$ being $\mu 1$ and a standard deviation of $|n1-n2|*h1$ being $\sigma 1$. The second multilayer optical film includes third and fourth optical layers defining a two-dimensional second grating interface therebetween. The third and fourth optical layers have respective different third and fourth refractive indices n3 and n4. The second grating interface has a grating height h2. At the reference wavelength $\lambda$, the second multilayer optical film has an average value of $|n3-n4|*h2$ being $\mu 2$ and a standard deviation of $|n3-n4|*h2$ being $\sigma 2$. $|\mu 1-\mu 2|>\sigma 1+\sigma 2$.

In some aspects of the present description, a headset including a first diffractive element, a second diffractive element disposed proximate the first diffractive element, and first and second optical systems is provided. The first diffractive element is disposed to receive a first image and transmit the first image to the first optical system, and the first optical system is configured to transmit the first image to a viewer. The second diffractive element is disposed to receive a second image and transmit the second image to the second optical system, and the second optical system is configured to transmit the second image to the viewer. For at least one wavelength, the first and second diffractive elements have at least one different corresponding diffractive property.

BRIEF DESCRIPTION OF THE DRAWINGS

FIGS. 6A-6D are schematic cross-sectional views of multilayer optical films;

DETAILED DESCRIPTION

Figure 1:
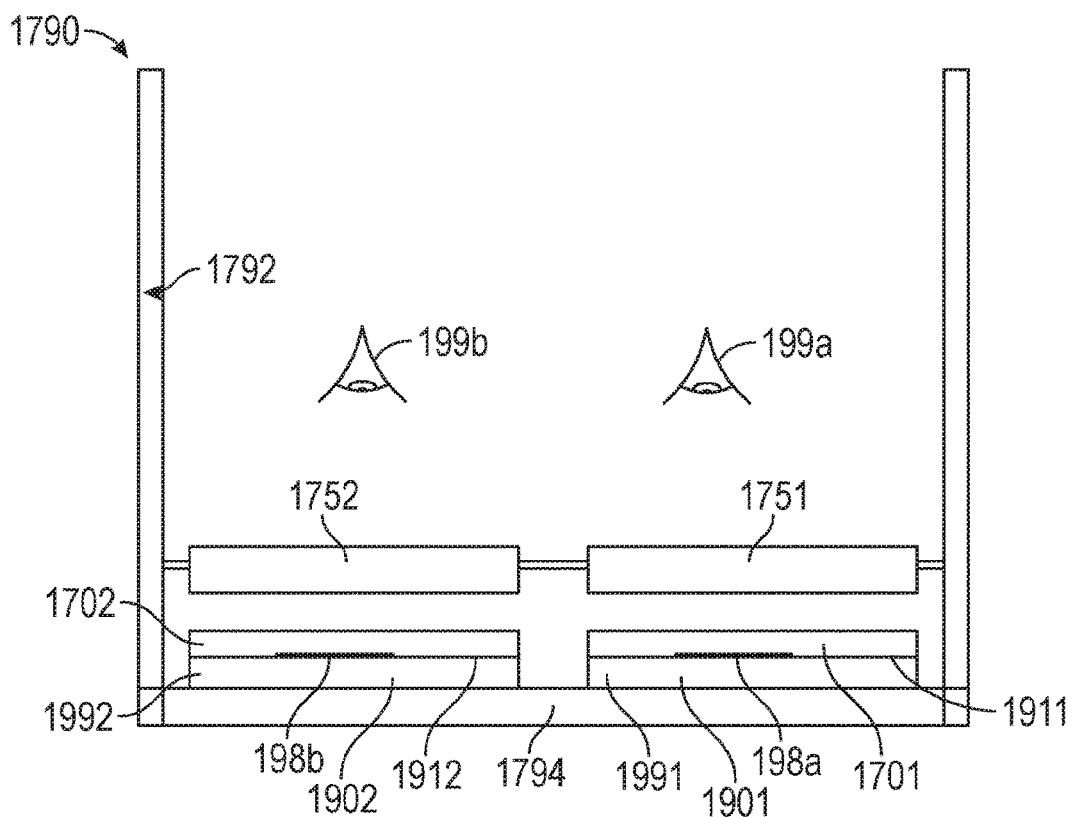
FIGS. 1-2 are schematic top views of head-mounted displays.

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

Displays typically include at least one two-dimensionally pixelated display surface. In some cases, the spaces between the pixels or subpixels are visible to a viewer and this may be objectionable, particularly in head-mounted displays in which an optical system magnifies a displayed image for viewing by a viewer. This is known as the screen-door effect or fixed-pattern noise. According to some embodiments of the present description, diffractive elements (e.g., gratings, grating surfaces, or grating interfaces in an optical film) for reducing the screen-door effect of a display are provided. According to some embodiments of the present description, it has been found that different diffractive elements for images provided to the left and right eyes can provide a greater reduction in the screen-door effect than using a common diffractive element for both eyes. For example, it has been found that optimizing the diffractive element for one eye to reduce the screen-door effect for green wavelengths, for example, and optimizing the diffractive element for the other eye to reduce the screen-door effect for red wavelengths, for example, results in a head-mounted display having a perceived screen-door effect reduced further than that obtained using a common grating for both eyes. Without intending to be limited by theory, it is believed that this results from the viewer's brain integrating the left and right images into a perceived common image.

According to some embodiments of the present description, the first and second diffractive elements are configured such that for at least one wavelength, the first and second diffractive elements have at least one different corresponding diffractive property. In some embodiments, the at least one diffractive property includes relative intensities of zero and first diffraction orders. For example, the first diffractive element may be configured to diffract a first wavelength into zero and first diffraction orders having approximately equal intensities, the second diffractive element may be configured to diffract a different second wavelength into zero and first diffraction orders having approximately equal intensities, and the first diffractive element may diffract the second wavelength into zero and first diffraction orders having substantially different intensities, and the second diffractive element may diffract the first wavelength into zero and first diffraction orders having substantially different intensities. Each of the diffractive elements may be or include at least one of a grating, a grating surface, or a grating interface. For example, the gratings may be provided as structured interfaces between adjacent optical layers of a multilayer optical film. A diffractive element generally diffracts at least one wavelength of visible light (400 nm to 700 nm) into at least zero and first diffraction orders. Useful diffractive elements include gratings having a periodic structure (e.g., a grating surface or a grating interface). In some embodiments, a grating has a variation of a periodic structure (e.g., a chirped grating).

FIG. 1 is a schematic top view of a head-mounted display 1790 including a headset 1792 having a frame portion 1794 for receiving first display 1901 and second display 1902. One or both of the first and second displays 1901 and 1902 may be permanently or releasably mounted to the frame portion 1794. The first and second displays 1901 and 1902 include respective first and second display surfaces 1911 and 1912 which are typically two-dimensionally pixelated display surfaces as described further elsewhere herein. The first and second displays 1901 and 1902 may be liquid crystal displays (LCDs) or organic light emitting displays (OLEDs), for example. The first and second displays 1901 and 1902 include respective first and second display panels 1991 and 1992 and may also include other components (e.g., electronics and, in the case of an LCD, a backlight and light source). The first and second display panels 1991 and 1992 are disposed to the left and right of one another and are configured to display images 198*a* and 198*b* to respective left and right eyes 199*a* and 199*b* of a viewer. The headset 1792 further includes first and second optical systems 1751 and 1752 each of which typically includes one or more optical lenses.

First and second diffractive elements 1701 and 1702 are disposed adjacent the respective first and second display surfaces 1911 and 1912. In some embodiments, the first and second diffractive elements 1701 and 1702 are substantially co-extensive with the respective first and second display surfaces 1911 and 1912. A diffractive element, such as a grating surface or a multilayer optical film including a grating interface, is substantially co-extensive with a display surface if it extends over at least 80 percent of the display surface and the display surface extends over at least 80 percent of the diffractive element.

In some embodiments, a head-mounted display includes pixelated first and second display surfaces (e.g., display surfaces 1911 and 1912), and non-overlapping first and second diffractive elements (e.g., first and second diffractive elements 1701 and 1702) substantially co-extensive with the respective first and second display surfaces, where for at least one wavelength, the first and second diffractive elements have at least one different corresponding diffractive property. A corresponding diffractive property may be one of an intensity of a zero diffraction order, an intensity of a first diffraction order (e.g., the intensity of the first diffraction order of the second diffractive element at a wavelength corresponds to the intensity of the first diffraction order of the first diffractive element at the same wavelength and these corresponding intensities may be different), or a relative intensity of zero and first diffraction orders, for example. In some embodiments, the at least one diffractive property includes relative intensities of zero and first diffraction orders. For example, in some embodiments, the first diffractive element is configured to diffract a first wavelength $\lambda 1$, but not a different second wavelength $\lambda 2$, into zero and first diffraction orders having intensities within 5% of each other, and the second diffractive element is configured to diffract the second wavelength $\lambda 2$, but not the first wavelength $\lambda 1$, into zero and first diffraction orders having intensities within 5% of each other. At the second wavelength $\lambda 2$, the first diffractive element typically produces zero and first diffraction orders, but their intensities are not within 5% of each other. For example, the first diffractive element may diffract the second wavelength $\lambda 2$ into zero and first diffraction orders such that intensities of the zero order and at least one of the first diffraction orders diffracted by the first diffractive element at the second wavelength $\lambda 2$ differ by at least 10% (the largest of these intensities minus the smallest of these intensities is at least 0.1 times the largest of these intensities), or at least 20%, or at least 30% from each other. Similarly, the second diffractive element may diffract the first wavelength $\lambda 1$ into zero and first diffraction orders such that intensities of the zero order and at least one of the first diffraction orders diffracted by the second diffractive element at the first wavelength $\lambda 1$ differ by at least 10%, or at least 20%, or at least 30% from each other. The specified intensities are for first or second wavelengths $\lambda 1$ and $\lambda 2$ incident on the diffractive element at normal incidence unless specified differently. In preferred embodiments, each of the first and second wavelengths λ1 and λ2 are in the visible range of 400 nm to 700 nm.

As another example, in some embodiments, the first diffractive element is configured to diffract a first wavelength λ1, but not a different second wavelength λ2, into zero and first diffraction orders having intensities within 10% of each other, and the second diffractive element is configured to diffract the second wavelength λ2, but not the first wavelength λ1, into zero and first diffraction orders having intensities within 10% of each other. As another example, in some embodiments, a first diffractive element diffracts a first wavelength λ1 into zero and first diffraction orders having intensities within 10% of each other, a second diffractive element diffracts a second wavelength λ2 into zero and first diffraction orders having intensities within 10% of each other, and the first and second wavelengths λ1 and λ2 are different by at least 50 nm, or at least 75 nm.

First and second display surfaces for displaying images to respective left and right eyes of a viewer may alternatively be referred to as left and right display surfaces, and the first and second diffractive elements (e.g., first and second grating surfaces) may alternatively be referred to as left and right diffractive elements (e.g., left and right grating surfaces). A wavelength where a left diffractive element has a specified property may be referred to as a first wavelength for the left diffractive element. Similarly, a wavelength where a right diffractive element has a specified property may be referred to as a first wavelength for the right diffractive element. For example, in some embodiments, each of a left and right grating surface diffracts a first wavelength into zero and first diffraction orders having intensities within 10% of each other, the first wavelength for the left grating surface being different than the first wavelength for the right grating surface by at least 50 nm, or at least 75 nm. In some embodiments, an absolute value of a difference between the first wavelength for the left grating surface and the first wavelength for the right grating surface is no more than 250 nm. As another example, in some embodiments, the left grating surface is configured to diffract the first wavelength for the left grating surface, but not the first wavelength for the right grating surface, into zero and first diffraction orders having intensities within 5% of each other, and the right grating surface is configured to diffract the first wavelength for the right grating surface, but not the first wavelength for the left grating surface, into zero and first diffraction orders having intensities within 5% of each other. In an alternative notation, wavelengths where first and second diffractive elements have a specified property may be referred to as respective first and second wavelengths λ1 and λ2.

Headset 1792 or head-mounted display 1790 may further include a camera and/or an eye tracking system as described further in U.S. Pat. No. 9,557,568 (Ouderkirk et al.). The optical systems 1751 and 1752 may include one or more optical lenses and/or may include folded optics as described in U.S. Pat. No. 9,557,568 (Ouderkirk et al.). In some embodiments, the head-mounted display 1790 is a virtual reality display, or an augmented reality display, or a mixed reality display.

Figure 2:
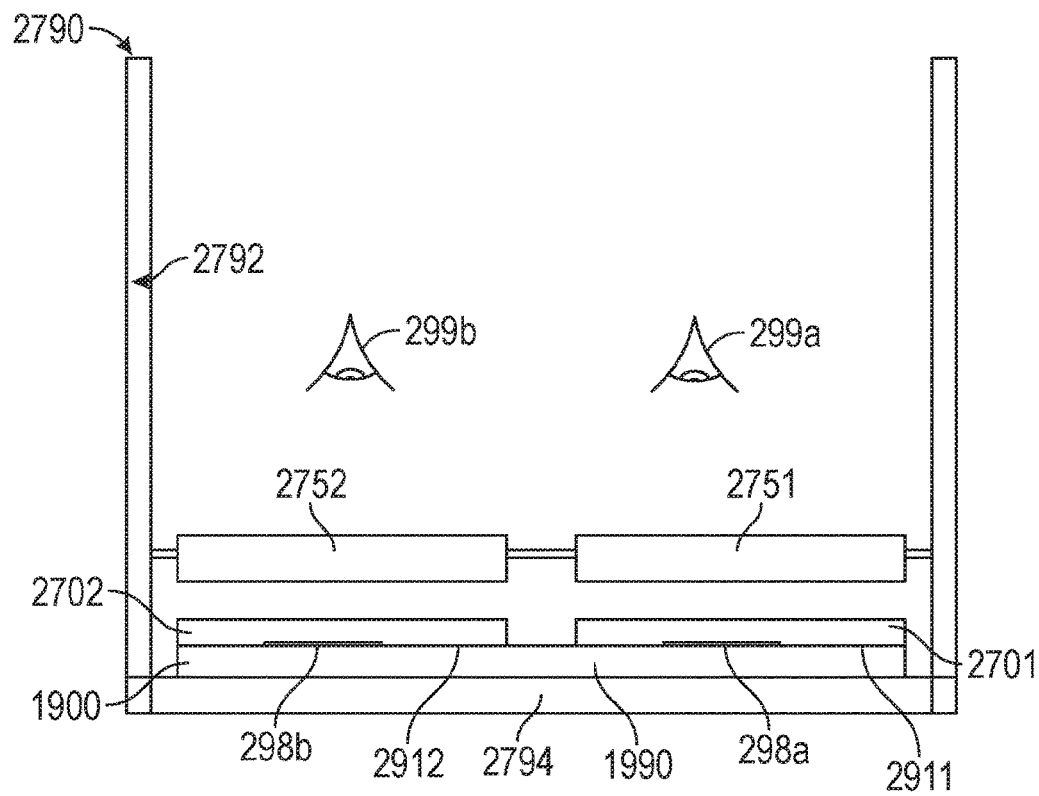

An alternate embodiment is illustrated in FIG. 2 which is a schematic top view of a head-mounted display 2790 including a headset 2792 having a frame portion 2794 for receiving a display 1900. The head-mounted display 2790 may be as described for head-mounted display 1790 except that a single display panel 1990 is used instead of first and second display panels 1991 and 1992. The display 1900 may be permanently or releasably mounted to the frame portion 2794. The display 1900 includes first and second display surfaces 2911 and 2912. In the illustrated embodiment, non-overlapping first and second portions of the display panel 1990 comprise the respective first and second display surfaces 2911 and 2912. For example, the first portion may be the portion of the display panel 1990 providing an image 298a to the left eye 299a of a viewer and the second portion may be the portion of the display panel 1990 providing an image 298b to the right eye 299b of the viewer. The first and second display surfaces 2911 and 2912 are typically two-dimensionally pixelated display surfaces as described further elsewhere herein. The display 1900 may be an LCD or an OLED display, for example. The headset 2792 further includes first and second optical systems 2751 and 2752 and first and second diffractive elements 2701 and 2702 which may be as described for head-mounted display 1790.

In some embodiments, the display 1900 includes first and second display panels disposed such that a light output of one of the first and second display panels passes through the other of the first and second display panels. Such stacked display panels are known in the art and are described in U.S. Pat. Appl. Publ. No. 2013/0083040 (Prociw), for example. In this case, the first and second diffractive elements 1701 and 1702 may be disposed on or adjacent to first and second display surfaces where the first and second display surfaces are non-overlapping first and second portions of one of the display panels (preferably, the one facing the first and second optical systems 1751 and 1752), or where the first and second display surfaces are, or are portions of, the first and second display panels.

Figure 3A:
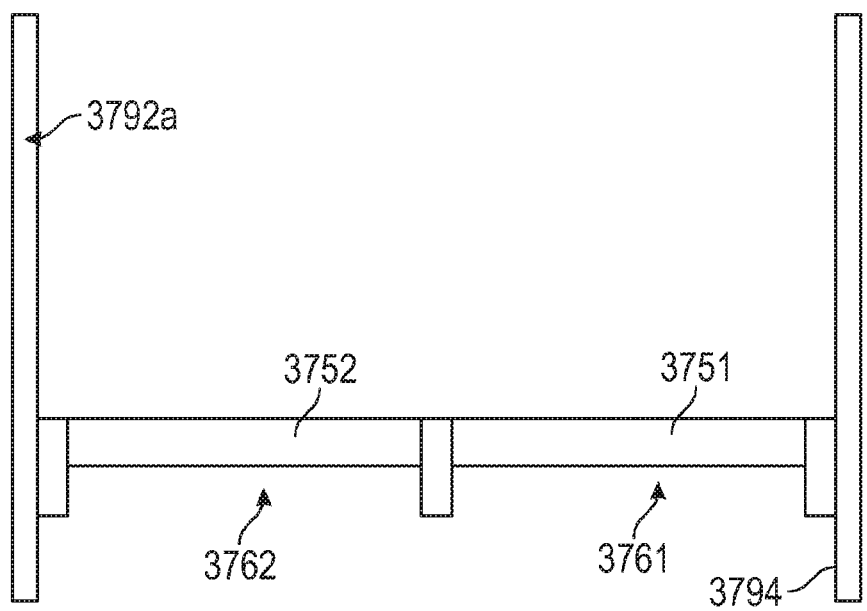
FIGS. 3A-3B are schematic top views of headsets.
Figure 3B:
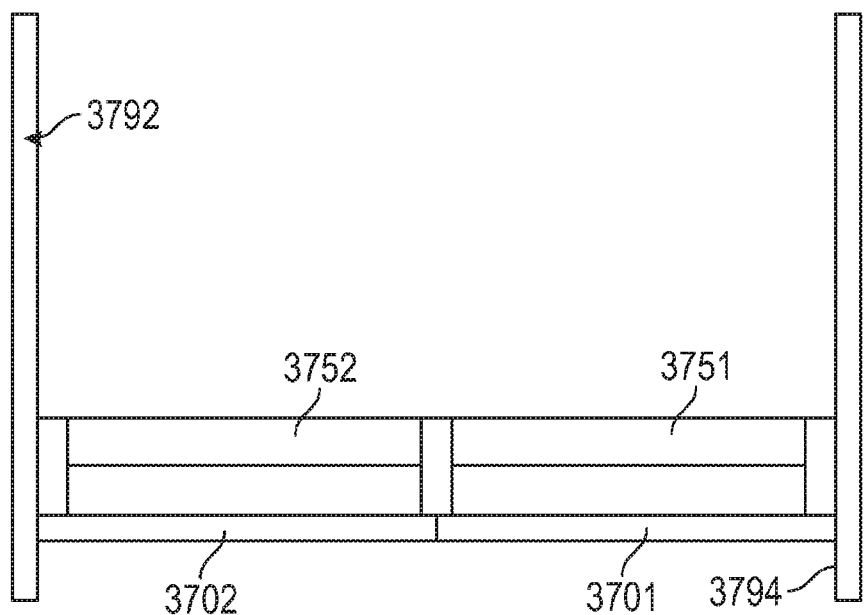
Figure 3C:
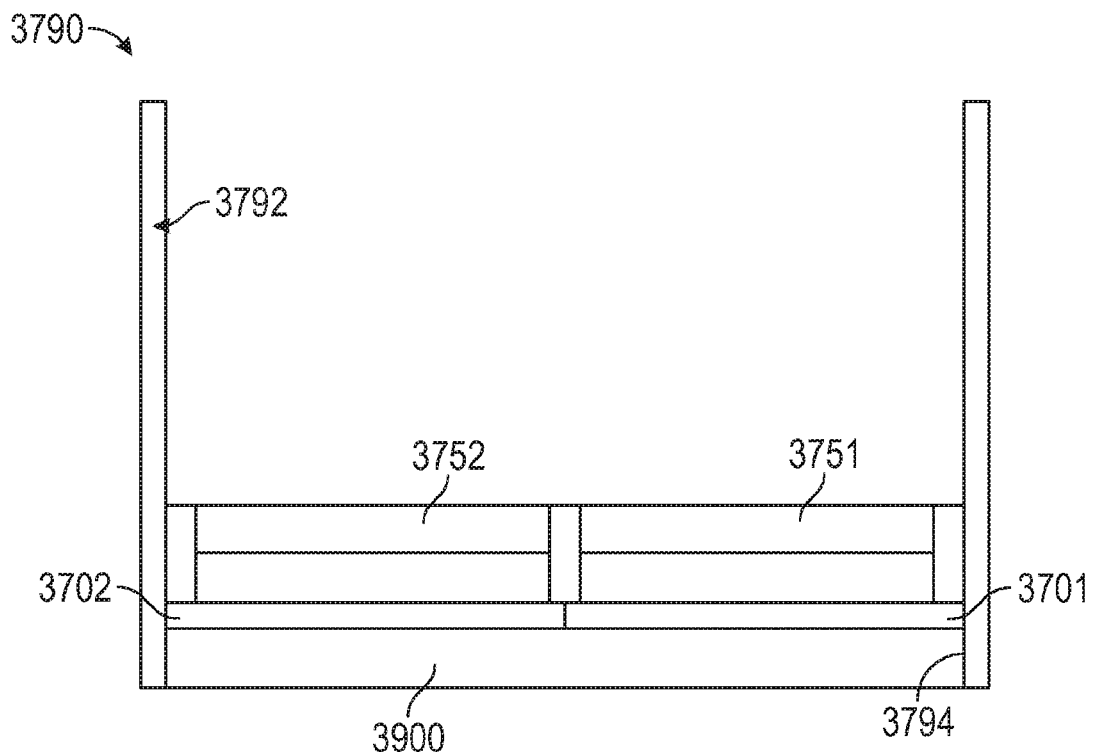
FIG. 3C is a schematic top view of a head-mounted display including the headset of FIG. 3B.
Figure 3D:
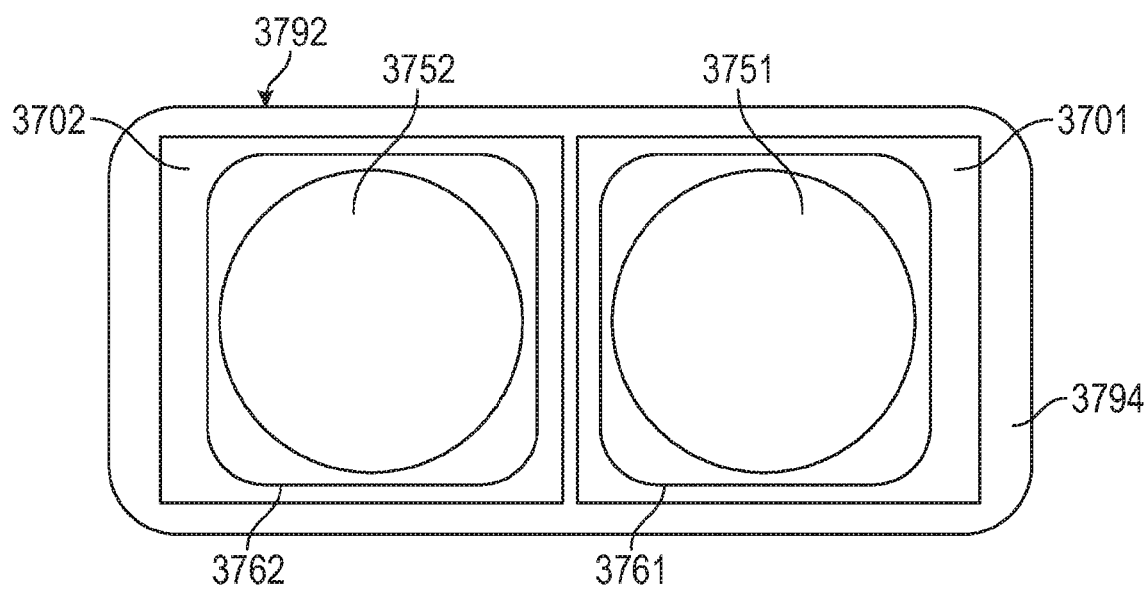
FIG. 3D is a schematic front view of the headset of FIG. 3B.

FIGS. 3A-3D illustrate a headset where a display device is removably attached to a frame portion of the headset. FIG. 3A-3B are respective schematic top views of headsets 3792a and 3792 without and with first and second diffractive elements 3701 and 3702 disposed over openings 3761 and 3762. In some embodiments, the first and second diffractive elements 3701 and 3702 are disposed on a common substrate which is mounted to the headset 3792 over the openings 3761 and 3762. The headsets 3792a and 3792 include first and second optical systems 3751 and 3752 which may be any of the optical systems described elsewhere herein. The headsets 3792a and 3792 include a frame portion 3794 for receiving a display device 3900. FIG. 3C is a schematic top view of a head-mounted display 3790 including the display device 3900 disposed on or in the headset 3792. The display device 3900 may be any suitable display device such as, for example, a touchscreen device (e.g., an IPOD Touch or a smartphone), a mobile device (e.g., a mobile phone), and/or a phone. FIG. 3D is a schematic front view of the headset 3792 without the display device 3900 in place.

Other headset designs known in the art may adapted to incorporate the first and second diffractive elements of the present description. Such headsets include the Oculus Rift headset, the Samsung Gear VR headset, the HTC Vive headset, the Huawei VR headset, the Lenovo Mirage Solo, the Google Daydream View, and the headsets described in U.S. Pat. Appl. Publ. No. 2015/0253574 (Thurber et al.), for example.

The diffractive elements schematically illustrated in FIGS. 1-2 and 3B-3D may be provided as grating surfaces or as grating interfaces between optical layers of multilayer optical films, for example.

Figure 4A:
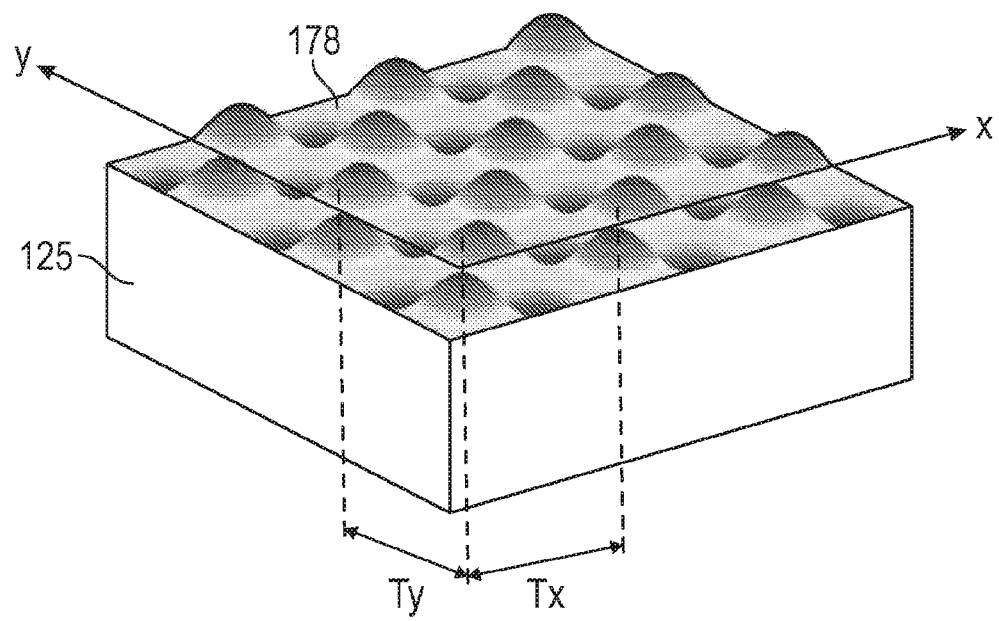
FIG. 4A is a perspective view of an optical layer.

FIG. 4A shows an optical layer 125 having a first major surface 178 which has a two-dimensional grating structure having a first period Tx along a first direction (x-direction) and a second period Ty along an orthogonal second direction (y-direction). In some embodiments, one or both of Tx and Ty are in a range from 1 micrometer, or 5 micrometers, or 7.5 micrometers, or 8 micrometers, to 30 micrometers, or 20 micrometers, or 15 micrometers, or 10 micrometers, or 9.5 micrometers. In some embodiments, Tx and Ty are within 10% of each other. Surface 178 may be coated with another material to form a grating interface. Descriptions of geometry or index contrast, for example, of any one of diffractive elements, grating interfaces and grating surfaces can apply to any other one of diffractive elements, grating interfaces and grating surfaces.

Figure 4B:
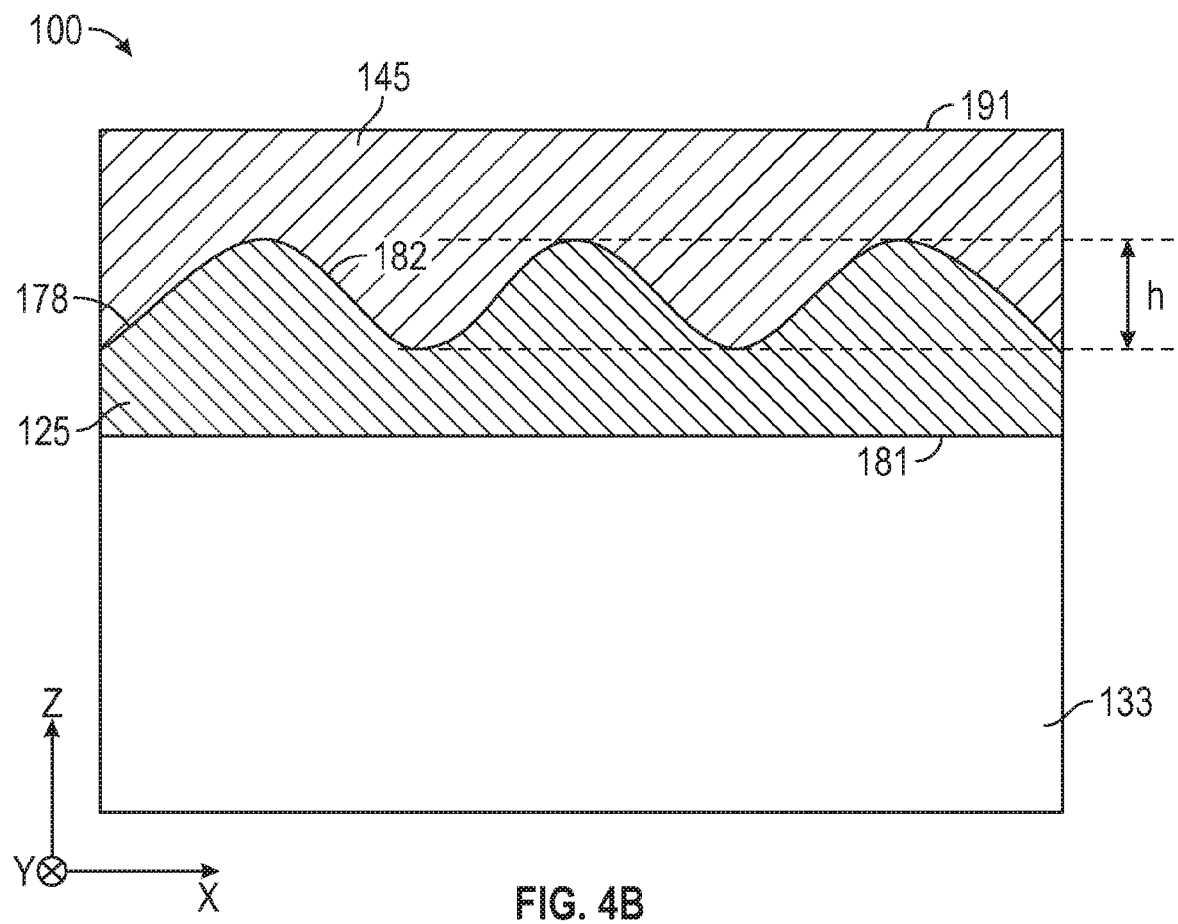
FIG. 4B is a schematic cross-sectional view of a multilayer optical film including the optical layer of FIG. 4A.

FIG. 4B shows a multilayer optical film 100 which includes first and second optical layers 125 and 145 with a two-dimensional grating interface 182 therebetween. The first and second optical layers 125 and 145 define a two-dimensional grating interface therebetween. The grating interface 182 extends along mutually orthogonal first and second directions (x- and y-directions). In some embodiments, the surface 178, which may be described as a grating surface, is continuous across the width and length of the first multilayer optical film 100. In some embodiments, the two-dimensional grating interface 182 is continuous across the width and length of the first multilayer optical film 100. In some embodiments, the two-dimensional grating interface 182 is a substantially sinusoidal grating. A sinusoidal grating has a height (in the z-direction) relative to a center plane that varies sinusoidally with position along the center plane (x- and y-positions). A substantially sinusoidal grating is a grating that gives a negligible difference in the diffraction pattern produced by incident visible light from that produced by a sinusoidal grating. A substantially sinusoidal grating may be nominally sinusoidal but differ from sinusoidal due to ordinary manufacturing variations, for example. The grating interface 182 has a grating height h. In the illustrated embodiment, the first optical layer 125 is disposed on an optional substrate 133, which may be a polymeric film (e.g., polyethylene terephthalate (PET)), for example.

Figure 4C:
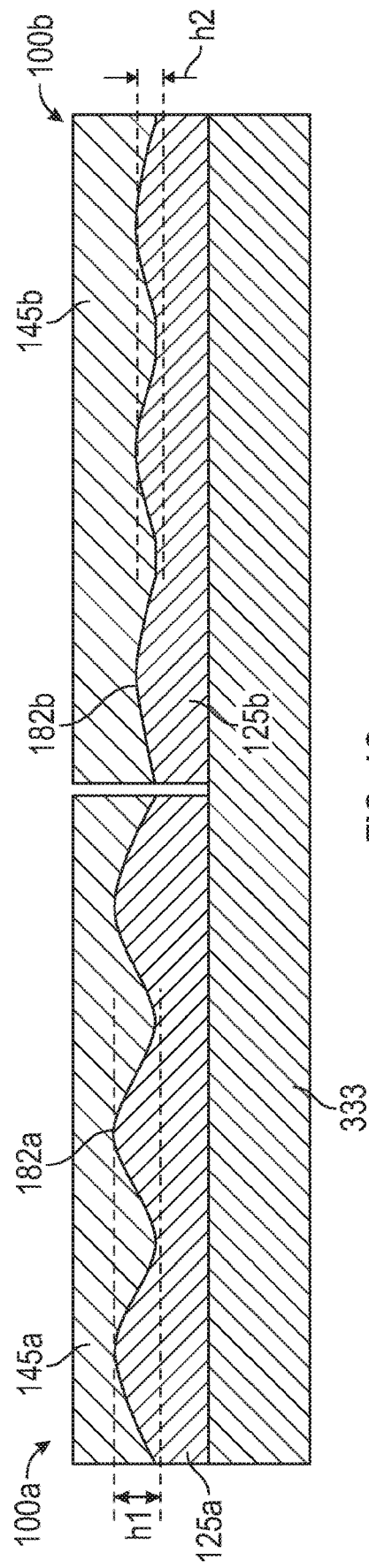
FIG. 4C is a schematic cross-sectional view of first and second multilayer optical films.

Different first and second multilayer optical films, each generally corresponding to optical film 100, may be used where one or more of the refractive indices of the optical layers or the heights of the grating interfaces differs between the first and second multilayer optical films. FIG. 4C illustrates first and second multilayer optical films 100a and 100b. First multilayer optical film 100a includes first and second optical layers 125a and 145a with a two-dimensional grating interface 182a therebetween. The grating interface 182a has a grating height h1. Second multilayer optical film 100b includes third and fourth optical layers 125b and 145b with a two-dimensional grating interface 182b therebetween. The grating interface 182b has a grating height h2. In the illustrated embodiment, the first and second multilayer optical films 100a and 100b are disposed on an optional layer 333 which may be a display, an adhesive layer for attaching the first and second multilayer optical films 100a and 100b to a display, a substrate layer of a headset, or a polymer film (e.g., PET), for example.

In some embodiments, the two-dimensional grating interface 182, or either of the grating interfaces 182a or 182b, has a period T, which may correspond to either or both of Tx and Ty, in any of the ranges described elsewhere herein. For example, in some embodiments, the period T is in a range of 1 micrometer to 30 micrometers, or in range of 5 to 30 micrometers, or in a range of 5 to 15 micrometers, or in a range of 7.5 micrometers to 10 micrometers, along each of the first and second directions. In some embodiments, the period along the first and second directions are equal or about equal. In other embodiments, the period T may be different in the different directions. For example, in some embodiments, the period T is about 8 micrometers along the first direction and the period T is about 9 micrometers along the second direction.

First optical layer 125 includes first outer major surface 181 and second optical layer 145 includes second outer major surface 191. In some embodiments, first outer major surface 181 is a substantially planar surface. In some embodiments, second outer major surface 191 is a substantially planar surface. Additional layers (e.g., a hardcoat layer or release liner or substrate (e.g., optional substrate 133)) may be disposed on one or both of the first and second outer major surfaces 181 and 191. Suitable materials for use as first optical layer 125 or second optical layer 145 include polymers, crosslinkable or crosslinked resins, and optically clear adhesives. In some embodiments, at least one of the first and second optical layers 125 and 145 comprises a crosslinked resin. Suitable resins are described further elsewhere herein. In some embodiments, at least one of the first and second optical layers 125 and 145 comprises an optically clear adhesive. Suitable adhesives are described further elsewhere herein. In some embodiments, the first optical layer 125 comprises a crosslinked resin and the second optical layer 145 comprises an optically clear adhesive. In some embodiments, the second optical layer 145 is an optically clear adhesive that is applied to first optical layer 125 forming a planarized layer. It will be understood that descriptions of a generic multilayer optical film (e.g., optical film 100) apply generally to both the first and second multilayer optical films (e.g., optical films 100a and 100b) with the first and second optical layers of the first multilayer optical film and the third and fourth optical layers of the second multilayer optical film corresponding to the respective first and second optical layers of the generic multilayer optical film.

In some embodiments, multilayer optical film 100 is a screen-door effect mitigation film for reducing a screen-door effect of a display. A headset for a head-mounted display may include a first multilayer optical film corresponding to multilayer optical film 100 or 100a proximate a two-dimensionally pixelated first display surface and a second multilayer optical film corresponding to multilayer optical film 100 or 100b proximate a two-dimensionally pixelated second display surface in order to reduce the appearance of the screen-door effect caused by gaps between pixels and/or subpixels of the first and second display surfaces while preserving a desired degree of resolution as described further elsewhere herein. According to some embodiments, it has been found that it is particularly advantageous to select the first grating of the first multilayer optical film to diffract a specified first wavelength $\lambda 1$ into approximately equal intensity zero and first diffraction orders, and to select the second grating of the second multilayer optical film to diffract a different specified different wavelength $\lambda 2$ into approximately equal intensity zero and first diffraction orders. In some embodiments, diffractive elements other than multilayer optical films are used. For example, a relief pattern in a substrate may be used as a diffractive element where the substrate may not be a film (e.g., a glass layer). The relief pattern may be backfilled with a material to provide a desired refractive index contrast or may be exposed to air. Descriptions for index contrast ranges and grating heights for multilayer optical films may apply to such a relief pattern.

The first optical layer 125a has a first refractive index n1, the second optical layer 145a has a second refractive index n2, the third optical layer 125b has a first refractive index n3 and the fourth optical layer 145b has a fourth refractive index n4. The refractive indices may be specified at a common reference wavelength λ (e.g., 532 nm, or 550 nm, or 632 nm) or the refractive indices for the first multilayer optical film may be specified at the wavelength λ1 and the refractive indices for the second multilayer optical film may be specified at the wavelength λ2.

In some embodiments, the absolute value of the difference in the first and second refractive indices, |n1−n2|, is at least 0.05, or at least 0.08, or at least 0.1, or at least 0.12, or at least 0.14. In some embodiments, the absolute value of the difference in the first and second refractive indices, |n1−n2|, is no more than 0.3, or no more than 0.26, or no more than 0.25, no more than 0.24, or no more than 0.22, or no more than 0.2, or no more than 0.19, no more than 0.18. For example, in some embodiments, |n1−n2| is in a range of 0.08 to 0.25, or in a range of 0.1 to 0.25, or in a range of 0.1 to 0.2, or in a range of 0.14 to 0.18. Similarly, in some embodiments, the absolute value of the difference in the third and fourth refractive indices, |n3−n4|, is at least 0.05, or at least 0.08, or at least 0.1, or at least 0.12, or at least 0.14. In some embodiments, the absolute value of the difference in the third and fourth refractive indices, |n3−n4|, is no more than 0.3, or no more than 0.26, or no more than 0.25, no more than 0.24, or no more than 0.22, or no more than 0.2, or no more than 0.19, no more than 0.18. For example, in some embodiments, |n3−n4| is in a range of 0.08 to 0.25, or in a range of 0.1 to 0.25, or in a range of 0.1 to 0.2, or in a range of 0.14 to 0.18. Any of these ranges may hold at the reference wavelength λ or at the wavelength λ1 or at the wavelength λ2. In some embodiments, the specified ranges for |n1−n2| are at the first wavelength λ1 and the specified ranges for |n3−n4| are at the second wavelength λ2.

In some embodiments, at the reference wavelength λ, |n3−n4| is equal to or about equal to |n1−n2| and h1 and h2 differ from each other. In some embodiments, at the reference wavelength λ, |n3−n4| differs from |n1−n2| and h1 and h2 are equal or about equal. In some embodiments, at the reference wavelength λ, |n3−n4| differs from |n1−n2| and h1 and h2 differ from each other.

Figure 4D:
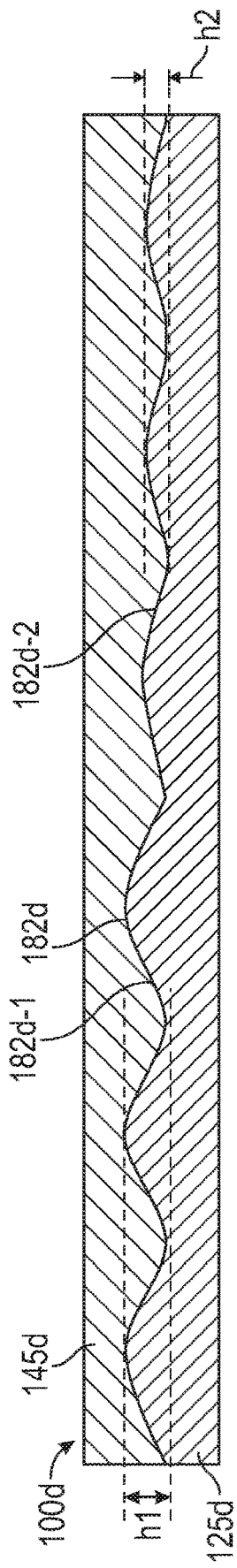
FIG. 4D is a schematic cross-sectional view of a multilayer optical film having first and second optical layers with an interface therebetween having first and second portions.

In some embodiments, non-overlapping first and second portions of an interface between first and second optical layers of a multilayer optical film defines respective first and second gratings. FIG. 4D is a schematic cross-sectional view of a multilayer optical film 100d having first and second optical layers 125d and 145d with an interface 182d therebetween. The interface 182d has first and second portions 182d-1 and 182d-2 which are first and second grating interfaces. In the illustrated embodiment, the first grating interface has a grating height h1 and the second grating interface has a different grating height h2. The optical film can be made by casting and curing the first layer 125d against a tool having different first and second regions corresponding to the first and second portions 182d-1 and 182d-2 and then backfilling the first layer 125d with the second layer 145d. In other embodiments, h1 and h2 are the same or about the same, and different resins having different refractive indices are used to backfill different portions of the first layer resulting in the different portions of the interface having different diffractive properties. Additional layers may also be included. For example, first optical layer 125d may be disposed on a substrate corresponding to optional substrate 133.

Figure 5:
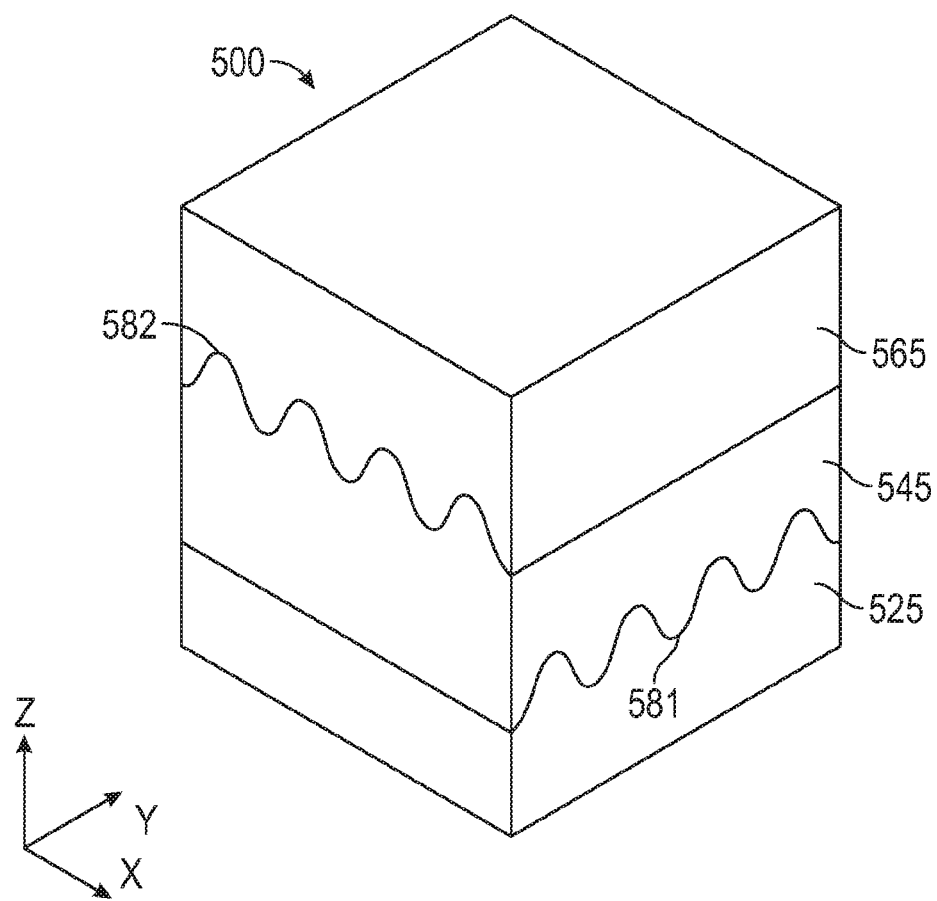
FIG. 5 is a perspective view of a multilayer optical film including first and second one-dimensional grating interfaces.

In some embodiments, at least one of the first and second diffractive elements includes a first one-dimensional grating extending in a first direction and a second one-dimensional grating extending in a different second direction. Each of the first and second gratings may have an index contrast and a grating height as described for optical film 100, 100a or 100b. FIG. 5 is a perspective view of a multilayer optical film 500 that includes first and second one-dimensional grating interfaces 581 and 582 extending in different directions. In the illustrated embodiment, the first grating interface 581 extends in the x-direction and the second grating interface 582 extends in the y-direction. The first grating interface 581 is an interface between first and second optical layers 525 and 545 and the second grating interface 582 is an interface between second and third optical layers 545 and 565. The one-dimensional grating interfaces may be substantially sinusoidal or other grating geometries may be used as described further elsewhere herein.

In some embodiments, a substantially sinusoidal two-dimensional grating interface is used for one or both of the first and second diffractive elements or for one or both of the left and right grating surfaces. In other embodiments, other grating patterns are used for one or both of the grating interfaces or grating surfaces. FIGS. 6A-6D schematically illustrate multilayer optical films 700a-700d including first 725a-725d and second 745a-745d optical layers with grating 782a-782d therebetween, respectively. Gratings 782a-782d may be one dimensional (grating elements extending substantially along a length or a width of the grating but not both) or two dimensional (grating elements localized along both a length and a width of the grating). The grating height h is indicated. Grating 782a is a rectangular grating, grating 782b is a square grating which can be understood to be a special case of a rectangular grating, grating 782c is a triangular grating, and grating 782d is a sawtooth grating. The first and second multilayer optical films 100a and 100b may include a same or a different type of grating pattern.

Figure 7:
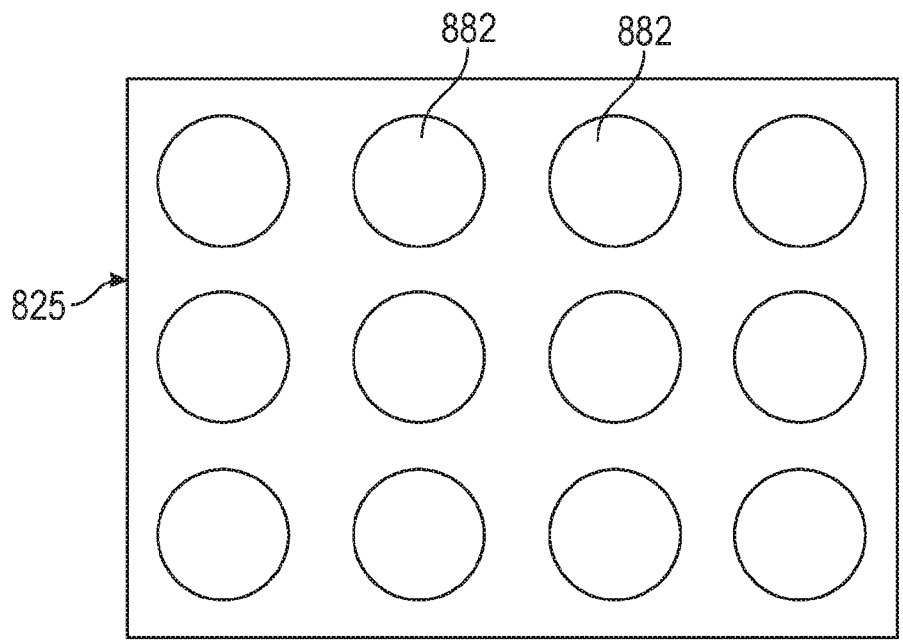
FIG. 7 is a schematic top view of a first optical layer having a grating surface.

In any of these cases, the grating element (rectangle, square, triangle or sawtooth) may extend an equal or approximately equal distance in each of the two in-plane directions. For example, the grating element may be a post or a pyramid or a cone. FIG. 7 is a schematic top view of a first optical layer 825 having a structured surface including a plurality of posts 882. First optical layer 825 can be coated with a second optical layer to form a grating interface comprising a post pattern. The posts can have a circular, elliptical, square, rectangular or triangular cross-section for example. The posts can have a uniform cross-section or can be tapered. The posts can be arranged on a square lattice as illustrated, or can be arranged on other lattices such as a triangular lattice, for example.

Figure 8:
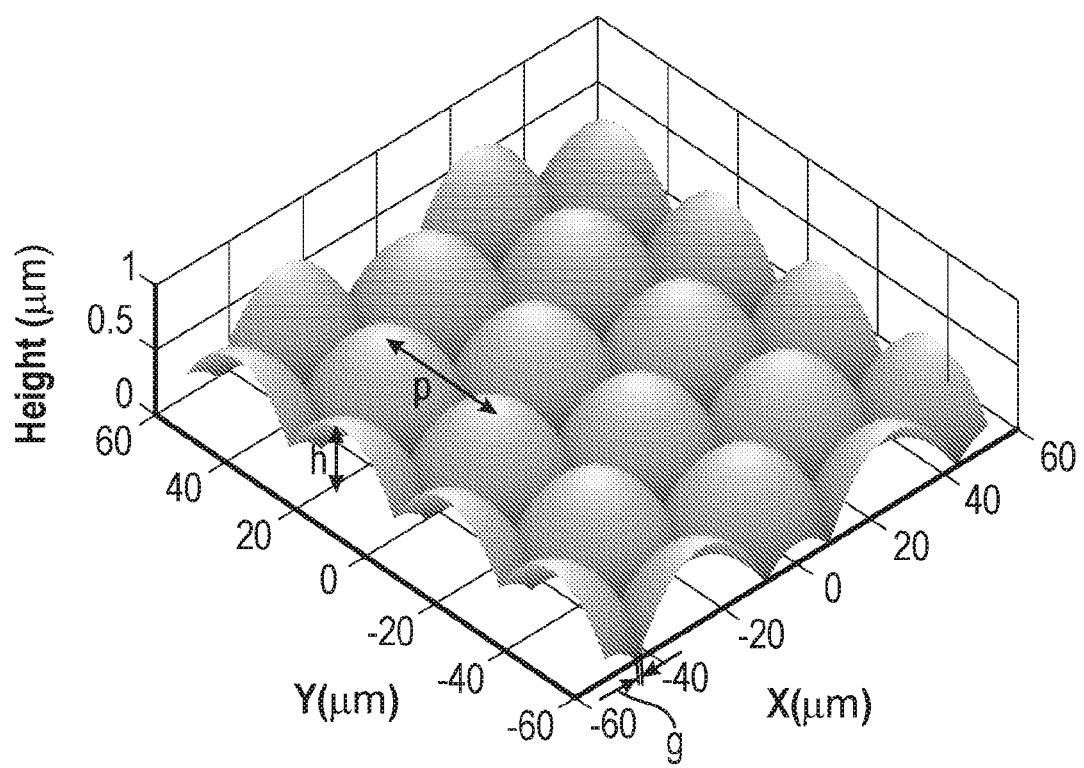
FIG. 8 is a perspective view of a surface of an array of mircolenses.

FIG. 8 is a perspective view of a surface of an array of mircolenses which can be used as a grating surface or a grating interface in one or both of the diffractive elements. In the illustrated embodiments, the microlenses are on a triangular lattice with a gap g between adjacent microlenses which may be zero or approximately zero. The microlenses have a height h, a center-to-center distance p between adjacent microlenses and a curvature (e.g., approximately 1/h). In some embodiments, the first diffractive element comprises a first plurality of microlenses and the second diffractive element comprises a second plurality of microlenses where the first and second pluralities of microlenses differ from one another by at least one of a height of the microlenses, a curvature of the microlenses, a center-to-center distance between adjacent microlenses, a gap between adjacent microlenses, or a refractive index of the microlenses.

In some embodiments, a grating is described by an equation of the form $$d = \tfrac{1}{2} A[f1(x) + f2(y)] \quad \text{(Equation 1)}$$

where x and y are in-plane coordinates, d is the displacement in the z-direction from a reference plane, $f1(x)$ and $f2(y)$ are periodic functions of x and y, respectively, that are normalized to vary between $-1$ and 1, and A is a parameter characterizing the peak to valley height of the grating. For a fixed x, A is the peak to valley height of the grating as y is varied. Similarly, for a fixed y, A is the peak to valley height of the grating as x is varied. In this case, the parameter A may be described as the grating height of the grating which may be denoted as h. In some embodiments, $f1(x)$ and $f2(y)$ are sine functions. For example, in some embodiments, a sinusoidal grating is described by $$d = \tfrac{1}{2} A[\sin(2\pi x/Tx) + \sin(2\pi y/Ty)] \quad \text{(Equation 2)}$$

where Tx and Ty are periods in the x and y directions, respectively. In some embodiments, a grating is described by Equation 1 or by Equation 2 and the grating height h of the grating is equal to the parameter A. In some embodiments, a grating has uniform peak heights and uniform valley heights, and the grating height h is the peak to valley height. In some embodiments, the peak heights and the valley heights are nominally uniform but may vary due to ordinary manufacturing variations, for example. In this case, an average H of the grating height h may be taken to be the average peak height minus the average valley height. In some embodiments, the grating height h of a periodic grating is taken to be 2 times the root mean square average in a unit cell of the height d relative to a center or mean height. This can be expressed as twice the standard deviation of the height or $h = 2\langle (d - \langle d \rangle)^2 \rangle^{1/2}$. For a sinusoidal grating described by Equation 2, this gives $\langle d \rangle = 0$, $\langle d^2 \rangle = A^2/4$, and $h = A$.

An average H of the grating height h over the grating may be in a specified range. In some cases, the difference between the grating height h and the average height H over the area of the grating is negligible. For example, an absolute value of a difference in h and H may be less than 2 percent over at least 90% of the grating. In some embodiments, a first grating interface has an average height H1 and a second grating interface has an average height H2 and |H1−H1| is greater than a sum of standard deviations of the grating heights of the first and second grating interfaces, or greater than the sum plus 1 nm, or plus 5 nm, or plus 10 nm. In some embodiments, the first and second optical layers 125a and 145a have respective different first and second refractive indices n1 and n2 at a reference wavelength λ (e.g., about 550 nm, and/or a wavelength between λ1 and λ2) and the third and fourth optical layers have respective different third and fourth refractive indices n3 and n4 at the reference wavelength λ, the first grating interface 182a has a grating height h1, first multilayer optical film 100a has an average value of |n1−n2|*h1 of μ1 and a standard deviation of |n1−n2|*h1 of σ1, the second grating interface 182b has a grating height h2, the second multilayer optical film has an average value of |n3−n4|*h2 of μ2 and a standard deviation of |n3−n4|*h2 of σ2. In some embodiments, σ1<0.1 μ1 and σ2<0.1 μ2. In some embodiments, |μ1−μ2| is greater than σ1+σ2, or greater than 2 (σ1+σ2), or greater than 4 (σ1+σ2), or greater than 8 (σ1+σ2), or greater than σ1+σ2+1 nm, or greater than σ1+σ2+5 nm, or greater than σ1+σ2+10 nm. In some embodiments, |μ1−μ2| is greater than 10 nm, or greater than 20 nm. In some embodiments, 200 nm>|μ1−μ2|>10 nm, or 120 nm>|μ1−μ2|>20 nm, or 90 nm>|μ1−μ2|>25 nm. In some embodiments, μ1 and μ2 are each in a range of 0.2 micrometers to 0.35 micrometers.

In some embodiments, the average height H of a grating (e.g., H1 and/or H2 for the first and/or second gratings) is at least 0.8 micrometers, or at least 1 micrometer, or at least 1.1 micrometers, or at least 1.2 micrometers, or at least 1.3 micrometers, or at least 1.4 micrometers. In some embodiments, H (e.g., H1 and/or H2) is no more than 6 micrometers, or no more than 4 micrometers, or no more than 3 micrometers, or no more than 2.5 micrometers, or no more than 2.4 micrometers, or no more than 2.3 micrometers, or no more than 2.1 micrometers, or no more than 1.9 micrometers. For example, in some embodiments, H1 is in a range from 1 micrometer to 4 micrometers or in a range of 1.1 micrometers to 2.4 micrometers, and H2 is in a range from 1 micrometer to 4 micrometers or in a range from 1 micrometers to 2.4 micrometers.

An absolute value of an average refractive index difference across the first (or left) grating interface may be denoted $\Delta n_1$ and an absolute value average refractive index difference across the second (or right) grating interface may be denoted $\Delta n_2$. $\Delta n_1$ and $\Delta n_2$ may be in any of the ranges described elsewhere herein for |n1−n2| or |n3−n4|. The average refers to the average over the grating interface. A difference between the average at any location and the index difference at that location may be negligible. In some embodiments, at the first wavelength λ1, $\Delta n_1$*H1 is at least 0.2 micrometers, at least 0.22 micrometers, or at least 0.23 micrometers, or at least 0.24 micrometers. In some embodiments, at the first wavelength λ1, $\Delta n_1$*H1 is no more than 0.35 micrometers, or no more than 0.32 micrometers, or no more than 0.3 micrometers, or no more than 0.29 micrometers. For example, in some embodiments, at the first wavelength λ1, $\Delta n_1$*H1 is in a range of 0.2 micrometers to 0.35 micrometers. In some embodiments, at the second wavelength λ2, $\Delta n_2$*H2 is at least 0.2 micrometers, at least 0.22 micrometers, or at least 0.23 micrometers, or at least 0.24 micrometers. In some embodiments, at the second wavelength λ2, $\Delta n_2$*H2 is no more than 0.35 micrometers, or no more than 0.32 micrometers, or no more than 0.3 micrometers, or no more than 0.29 micrometers. For example, in some embodiments, at the second wavelength λ2, $\Delta n_2$*H2 is in a range of is in a range of 0.2 micrometers to 0.35 micrometers. In some embodiments, $\Delta n_2$*H2 > $\Delta n_1$*H1. In some embodiments, 120 nm > $\Delta n_2$*H2 − $\Delta n_1$*H1 > 10 nm.

The multilayer optical films of the present description can be produced in a variety of ways. In some embodiments, the first optical layer is made by first producing a release tool. The release tool can be made by casting and curing (e.g., in a continuous cast and cure process) a layer having a structured surface on a film, such as a polyethylene terephthalate (PET) film. In a continuous cast and cure process a microreplication roll can be made using a diamond tool to cut an inverted pattern into a copper roll which can be used to make the pattern on a substrate using a continuous cast and cure process utilizing a polymerizable resin. Suitable diamond tooling is known in the art and includes the diamond tooling described in U.S. Pat. No. 7,140,812 (Bryan et al.). Continuous cast and cure processes are known in the art and are described in the following patents: U.S. Pat. No. 4,374,077 (Kerfeld); U.S. Pat. No. 4,576,850 (Martens); U.S. Pat. No. 5,175,030 (Lu et al.); U.S. Pat. No. 5,271,968 (Coyle et al.); U.S. Pat. No. 5,558,740 (Bernard et al.); and U.S. Pat. No. 5,995,690 (Kotz et al.). The resulting structure can then be treated using conventional surface treatment techniques to produce a structured release tool. For example, a surface treatment may include an oxygen plasma treatment followed by a tetramethylsilane (TMS) plasma treatment. A cross-linkable resin, for example, can then be coated onto the treated surface of the release tool and cured. The release tool can then be removed to produce a first optical layer 125 that can be coated with a second optical layer 145 to provide the multilayer optical film 100. Multilayer optical films 100a and 100b can be provided similarly. The additional processes useful for making multilayer optical film 100 or 100a or 100b include those described in U.S. Pat. Appl. Pub. Nos. 2016/0016338 (Radcliffe et al.), 2017/0131559 (Sitter et al.), and 2017/0115498 (Sitter et al.). In other embodiments, the first optical layer 125 is cast and cured onto a polymer substrate and then the second optical layer 145 is coated onto the first optical layer 125 to provide the optical film 100. In this case, the polymer substrate is an additional layer in the multilayer optical film 100. Other multilayer optical films described herein can be provided similarly.

In other embodiments, the first major surface 178 is structured by machining, for example, a structure into an outer surface of a film, and the second optical layer 145 is formed by coating onto the resulting machined surface to provide the multilayer optical film 100. Other multilayer optical films described herein can be provided similarly.

In some embodiments, one of both of the first and second optical layers is a crosslinked resin layer. Crosslinkable or curable resins may be deposited or coated onto a surface in liquid form and then the coating cured, for example, by applying actinic radiation or heat, to form a crosslinked resin layer. The actinic radiation used to cure the coating of curable resin may be e-beam or ultraviolet (UV) radiation. Crosslinking a coated resin in this way can result in a layer with low or substantially no birefringence.

Suitable curable resins that can be used for forming one or both of the first and second optical layers, and/or one or both of the third and fourth optical layers, include UV-curable acrylates, such as such as polymethyl methacrylate (PMMA), aliphatic urethane diacrylates (such as Photomer 6210, available from Sartomer Americas, Exton, Pa.), epoxy acrylates (such as CN-120, also available from Sartomer Americas), and phenoxyethyl acrylate (available from Sigma-Aldrich Chemical Company, Milwaukee, Wis.). Other suitable curable resins include moisture cured resins such as Primer M available from MAPEI Americas (Deerfield Beach, Fla.).

In some embodiments, one of both of the first and second optical layers, and/or one or both of the third and fourth optical layers, is an adhesive layer, such as an optically clear adhesive layer. An optically clear adhesive has a high transmittance and a low haze. For example, in some embodiments, an optically clear adhesive layer has a transmittance of at least 95%, or at least 98%, or at least 99%, and a haze of less than about 5%, or less than about 2%, or less than about 1%. A non-adhesive (e.g., crosslinked resin) layer may also be optically clear with a transmittance and haze in any of these ranges. Suitable adhesives include viscoelastic or elastomeric adhesives which may be pressure-sensitive adhesives (PSAs), rubber-based adhesives (e.g., rubber, urethane) and silicone-based adhesives. Viscoelastic or elastomeric adhesives also include heat-activated adhesives which are non-tacky at room temperature but become temporarily tacky and are capable of bonding to a substrate at elevated temperatures. Heat activated adhesives are activated at an activation temperature and above this temperature have similar viscoelastic characteristics as PSAs. Viscoelastic or elastomeric adhesives may be substantially transparent and optically clear. Any of the viscoelastic or elastomeric adhesives of the present description may be viscoelastic optically clear adhesives. Elastomeric materials may have an elongation at break of greater than about 20 percent, or greater than about 50 percent, or greater than about 100 percent. Viscoelastic or elastomeric adhesive layers may be applied directly as a substantially 100 percent solids adhesive or may be formed by coating a solvent-borne adhesive and evaporating the solvent. Viscoelastic or elastomeric adhesives may be hot melt adhesives which may be melted, applied in the melted form and then cooled to form a viscoelastic or elastomeric adhesive layer.

Suitable adhesives include elastomeric polyurethane or silicone adhesives and the viscoelastic optically clear adhesives CEF22, 817x, and 818x, all available from 3M Company, St. Paul, Minn. Other useful viscoelastic or elastomeric adhesives include PSAs based on styrene block copolymers, (meth)acrylic block copolymers, polyvinyl ethers, polyolefins, and poly(meth)acrylates.

Figure 9A:
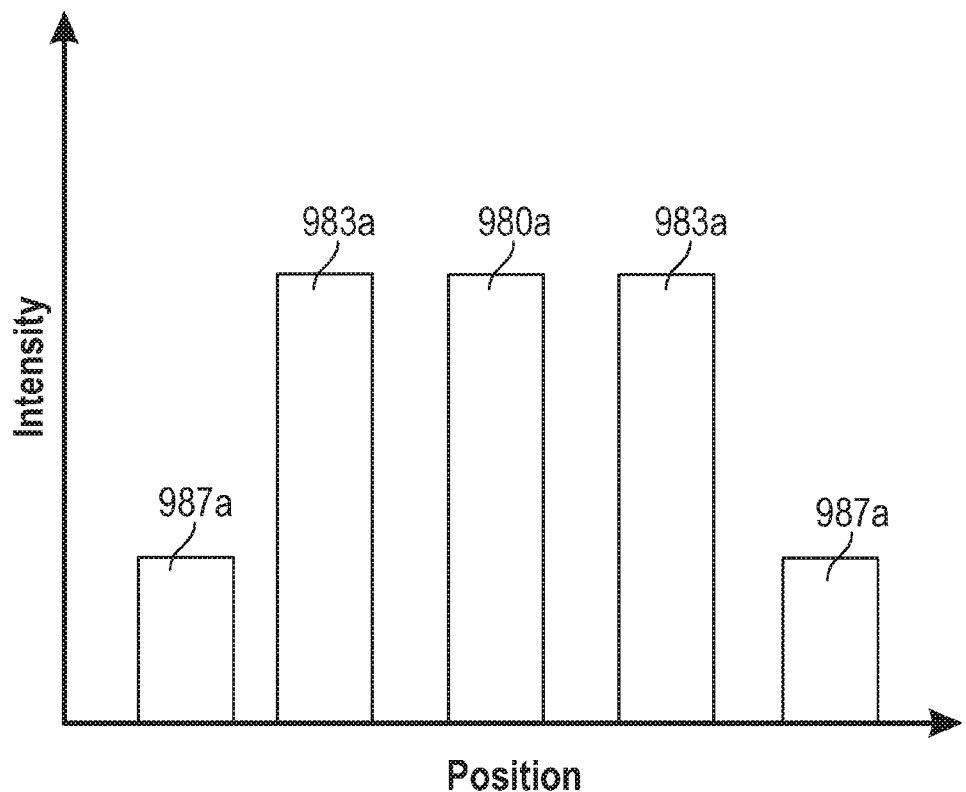
FIGS. 9A-9B are schematic illustrations of intensities of zero, first and higher diffraction orders.
Figure 9B:
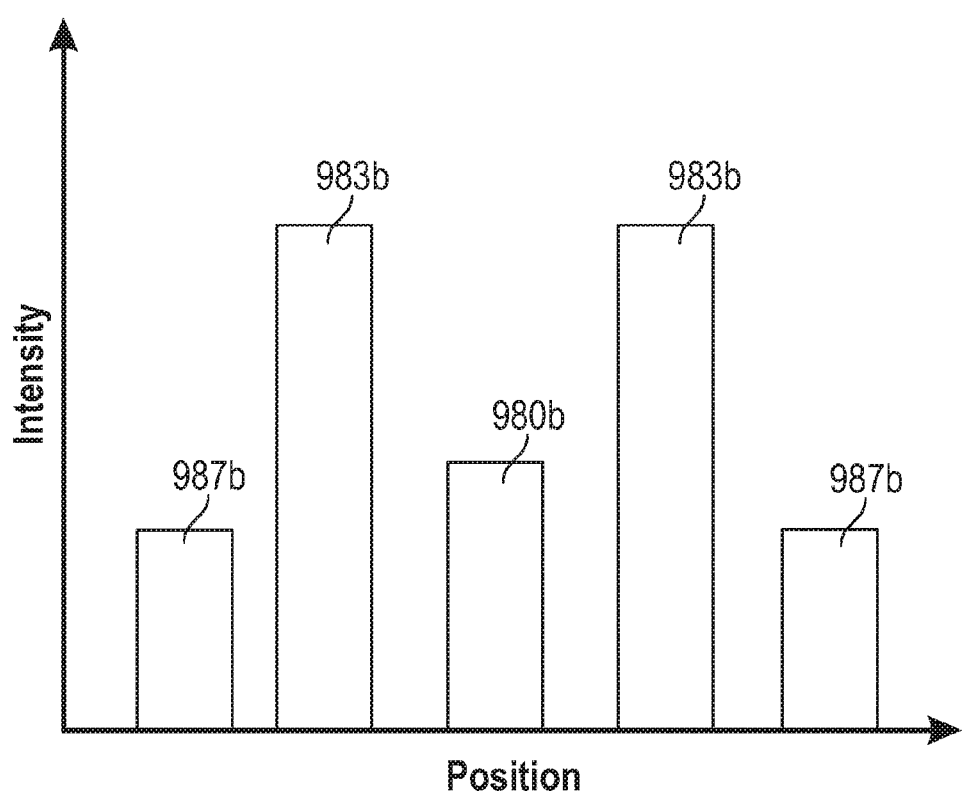

FIG. 9A schematically illustrates intensities of zero (980a) and first diffraction orders (983a) at a first wavelength where the intensities of the zero and first diffraction orders (980a and 983a) are approximately equal. In this context, approximately equal means that the intensities of the zero and first diffraction orders are within 5% of each other (the largest of these intensities minus the smallest of these intensities is no more than 0.05 times the largest of these intensities). Higher diffraction orders 987a having substantially lower intensities are also illustrated. FIG. 9B schematically illustrates corresponding (e.g., produced with the same diffractive element) intensities of zero (980b) and first diffraction orders (983b) at a different second wavelength where the intensities of the zero and first diffraction orders (980b and 983b) significantly differ (e.g., not within 5% of one another). Higher diffraction orders 987b are also illustrated. The diffraction patterns illustrated in FIGS. 9A-9B may be diffraction patterns produced by a one-dimensional grating or may be cross-sections through diffraction patterns produced by a two-dimensional grating, for example.

Figure 10:
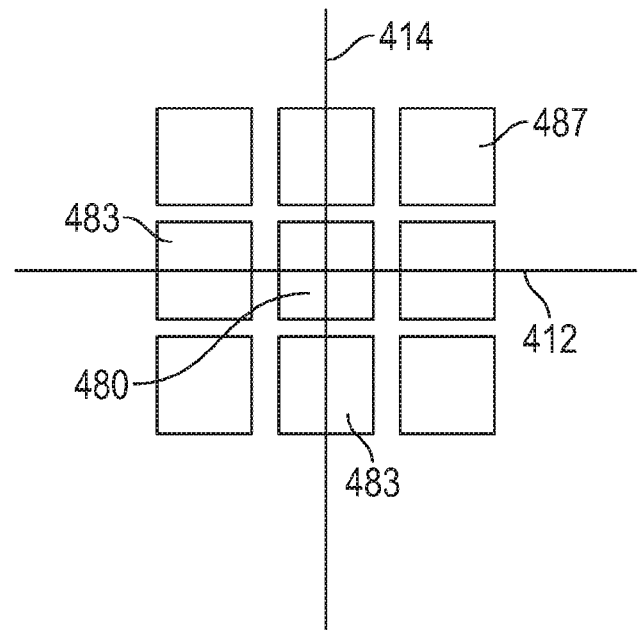
FIGS. 10-11 are a schematic top views of diffraction patterns produced by diffractive elements diffracting a subpixel.

The diffractive elements may include a two-dimensional grating. For example, a multilayer optical film may include a grating formed by adjacent optical layers defining a two-dimensional grating interface therebetween. The grating interface may extend along mutually orthogonal first and second directions. FIG. 10 is a schematic top view of a diffraction pattern produced by a grating diffracting a subpixel. Mutually orthogonal first and second axes or directions 412 and 414 are illustrated. The first and second directions 412 and 414 may make oblique angles relative to major axes of a pixelated display in order to reduce moiré, for example. The grating diffracts at least one subpixel in each pixel into a zero diffraction order 480 and a plurality of first diffraction orders 483 along each of the first and second directions. In some embodiments, at a specified wavelength, intensities of the zero and first diffraction orders are within 5% of each other. The specified wavelength is the wavelength $\lambda 1$ for the first grating or first multilayer optical film and the specified wavelength is the wavelength $\lambda 2$ for the second grating or second multilayer optical film.

There is a single zero diffraction order 480 and four first diffraction orders 483 illustrated in FIG. 10. Second diffraction orders 487 are also illustrated. The diffraction peaks produced by a two-dimensional grating extending along orthogonal directions can be represented by a pair of integers (q1,q2) characterizing the diffraction in each of the two orthogonal directions. In this representation, a zero diffraction order can be represented by (0,0) and a first diffraction order can be represented by ($\pm 1$,0), (0,$\pm 1$). The first diffraction orders (±1,0) are along the first direction 412 and the first diffraction orders (0,±1) are along the second direction 414.

Figure 11:
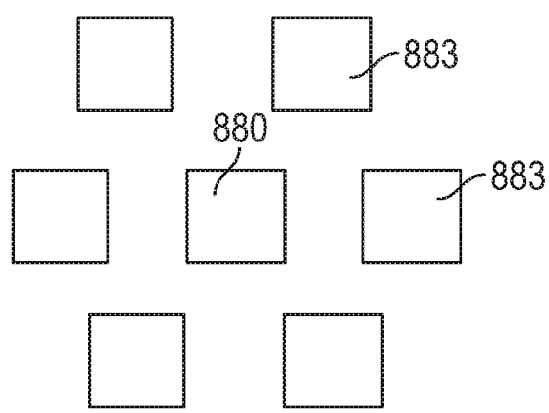

FIG. 11 is a schematic top view of a diffraction pattern produced by elements (e.g., microlenses) arranged on a triangular lattice (see, e.g., FIG. 8) diffracting a subpixel. A zero diffraction order 880 and six first diffraction orders 883 are illustrated. The pattern of the first diffraction orders 883 reflects the symmetry of the lattice.

There may be higher diffraction orders not illustrated in FIG. 10 or 11. The relative intensities of the zero and first diffraction orders vary with |n1−n2|*H1 (and similarly for |n3−n4|*H2) for a given wavelength. Typically, the intensity of the zero diffraction order decreases with increasing |n1−n2|*H1 and the intensities of the first diffraction orders increase with increasing |n1−n2|*H1 over some range of |n1−n2|*H1 of interest, so that for a given wavelength λ, the grating can be selected to provide intensities of the zero and first diffraction orders that are within 5% of each other by suitably selecting |n1−n2|*H1. In some embodiments, when |n1−n2|*H1 is selected such that the zero and first diffraction orders have equal intensities at one wavelength, the intensity will not be matched at a different wavelength.

Figure 12:
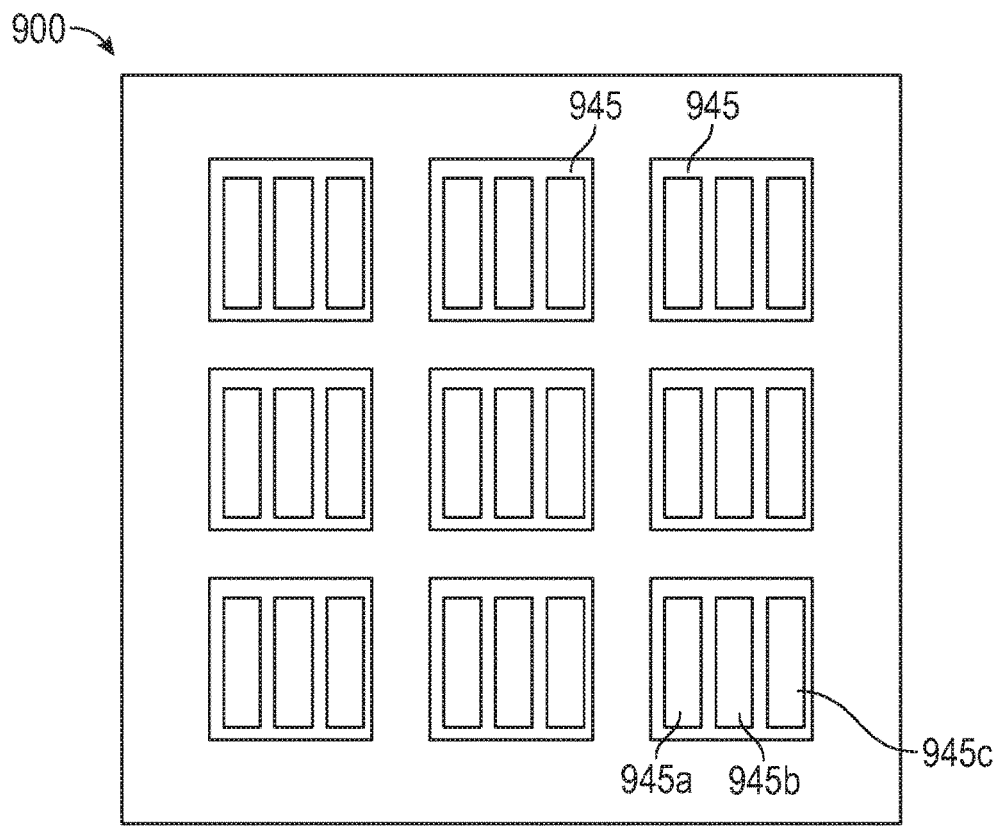
FIG. 12 is a schematic top view of a pixelated display surface.

FIG. 12 is a schematic illustration of a two-dimensionally pixelated display surface 900 for displaying an image. The display surface 900 includes a plurality of pixels 945. Each of the pixels 945 typically includes three or more subpixels which allow a desired color to be produce by each pixel 945. For example, the illustrated subpixels 945a, 945b and 945c may be blue, green and red subpixels which can have output levels adjustable to provide a desired color and a desired intensity. Additional subpixels (e.g., yellow) may be included in some embodiments. The pixel and subpixel arrangement can be similar to or different from that schematically illustrated in FIG. 12. For example, a triangular pattern, striped pattern, diagonal pattern, or a PENTILE matrix can be used, as is known in the art. In the case of a PENTILE matrix which includes red and green pairs of subpixels and green and blue pairs of subpixels, for example, each pixel can be understood to include a red and green pair and a green and blue pair, so that each pixel includes four subpixels.

In some embodiments, an organic light emitting diode (OLED) display is used and the subpixels 945a, 945b and 945c include emissive layers which are used as the light source for the display. In some embodiments, a liquid crystal display (LCD) is used and a separate light source is used to provide a light input into a backlight of the LCD display and the pixels and subpixels are formed by the LCD panel.

Figure 13:
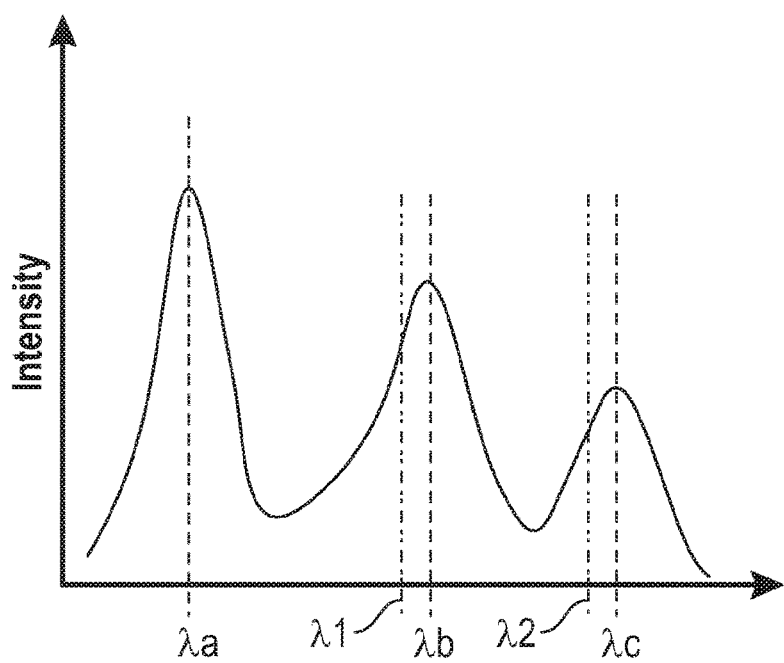
FIG. 13 is a schematic illustration of an emission spectrum produced by a display surface.

FIG. 13 is a plot of an emission spectrum produced by a display surface. Three peaks are present corresponding to colors of the subpixels 945a, 945b and 945c. The shortest peak wavelength is denoted λa, the longest peak wavelength is denoted λc, and an intermediate peak wavelength is denoted λb. In the case of an OLED display, the wavelength dependence may be provided by a pixelated emissive layer, for example. In the case of an LCD display, the wavelength dependence may be provided a color filter, for example. In some embodiments, λa is in a range of about 400 nm to about 500 nm, λc is in a range of about 580 nm to 700 nm, and λb is greater than λa and less than λc. In some embodiments, λa is in a range from about 440 nm to about 480 nm, λb is in a range of about 510 nm to about 550 nm, and λc is in a range of about 600 nm to about 640 nm.

In some embodiments, the first wavelength λ1 for the first diffractive element (or the first wavelength for the left diffractive element) is closer to λb than to λc, and the second wavelength λ2 for the second diffractive element (or the first wavelength for the right diffractive element) is closer to λc than to λb. λ1 may be less than, about equal to, or greater than λb. λ2 may be less than, about equal to, or greater than λc. In some embodiments, λ1 is a first primary color wavelength (e.g., green) and λ2 is a different second primary color wavelength (e.g., red). In some embodiments, λ1 is in a range of 480 nm 580 nm, or 500 nm 570 nm, or 520 nm 550 nm. In some embodiments, λ2 is in a range of 600 nm 700 nm, or 625 nm 700 nm, or 650 nm 700 nm. In some embodiments, 25 nm≤λ2−λ1≤250 nm, or 50 nm≤λ2−λ1≤200 nm.

Figure 14A:
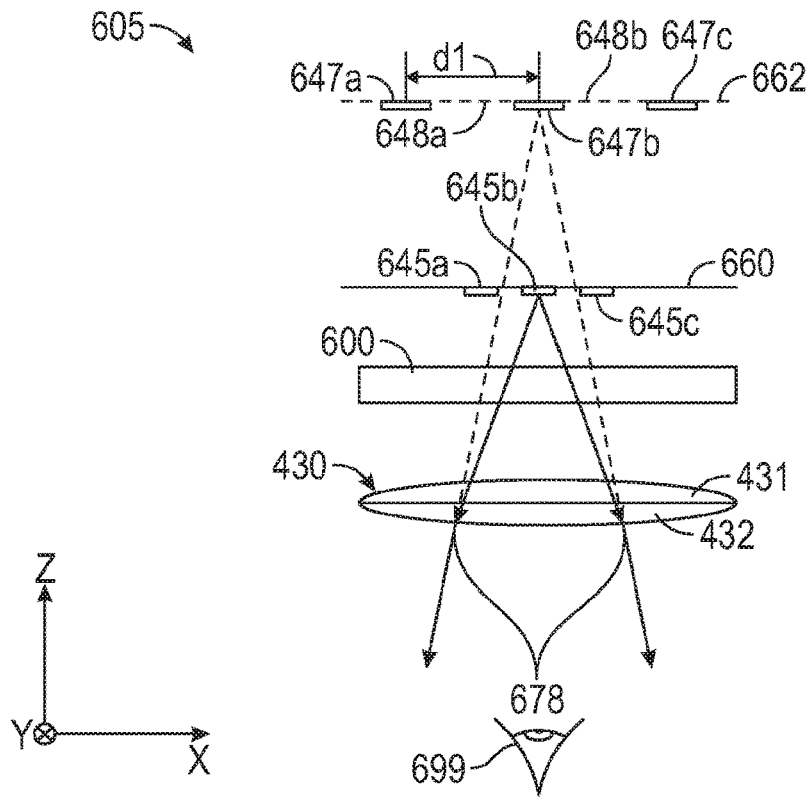
FIGS. 14A-14B are schematic cross-sectional views of an optical imaging system.

FIG. 14A is a schematic cross-sectional view of a display system 605. A pixilated display surface 660 is schematically illustrated. The pixelated display surface may correspond to the display surface 900, for example. A pixel having three subpixels 645a, 645b, and 645c separated by gaps is illustrated. More generally, the pixelated display surface 660 includes at least one pixel comprising at least two subpixels spaced apart by a gap. Typically, a plurality of pixels is included in order to provide a pixelated image.

A diffractive element 600 is disposed proximate the display surface 660. The display system 605 includes an optical system 430 adjacent to the diffractive element 600. The diffractive element diffracts at least one subpixel in each pixel of the display surface 660 into a zero order diffracted subpixel and a plurality of first order diffracted subpixels. The display system 605 images the zero order diffracted subpixels onto an image surface 662 as corresponding imaged subpixels spaced apart by a corresponding imaged gap. Subpixels 645a, 645b and 645c are imaged as corresponding imaged subpixels 647a, 647b and 647c, respectively. The gap between subpixels 645a and 645b is imaged as imaged gap 648a and the gap between subpixels 645b and 645c is imaged as imaged gap 648b.

The display system 605 may be configured to provide virtual or real images of the subpixels and gaps. In the illustrated embodiment, the imaged subpixels and the imaged gap are virtual images. Light 678 which forms a virtual image on the image surface 662 is illustrated in FIG. 14A.

Figure 14B:
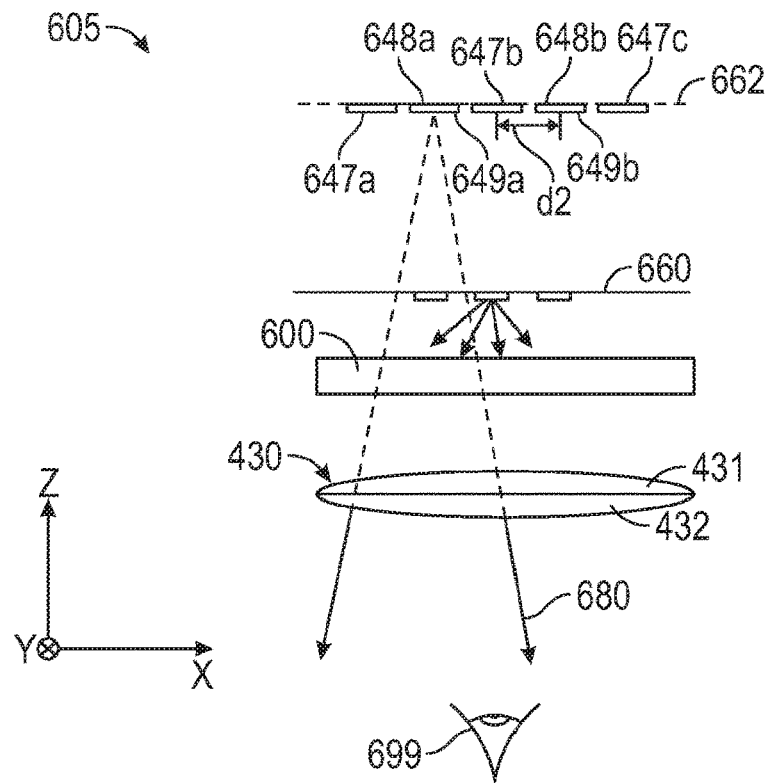

FIG. 14B is a schematic cross-sectional view of the display system 605 illustrating first order diffracted light 680. The display system 605 is configured to image each first order diffracted subpixel onto the image surface 662 as an imaged duplicate subpixel (e.g., imaged duplicate subpixels 649a and 649b) such that nearest adjacent imaged subpixels are separated by an imaged gap (e.g., imaged gaps 648a and 648b) and at least one imaged duplicate subpixel at least partially fills the imaged gap (e.g., imaged duplicate subpixels 649a and 649b at least partially fills the imaged gaps 648a and 648b, respectively).

A center-to-center distance d1 between the imaged subpixel 647b and a nearest adjacent imaged subpixel 647a is depicted in FIG. 14A. A center-to-center distance d2 between the imaged subpixel 647b and a nearest adjacent imaged duplicate subpixel 649b is depicted in FIG. 14B. In some embodiments, for each imaged subpixel, a center-to-center distance d2 between the imaged subpixel and a nearest adjacent imaged duplicate subpixel is in a range of 0.1 to 0.9, or in a range of 0.25 to 0.75, times a center-to-center distance d1 between the imaged subpixel and a nearest adjacent imaged subpixel.

In the illustrated embodiment, optical system 430 includes first and second optical lenses 431 and 432. In other embodiments, the optical system 430 may include only one optical lens or may include more than two optical lenses. In some embodiments, the optical system includes components configured to provide a folded optical path as described in U.S. Pat. No. 9,557,568 (Ouderkirk et al.).

A head-mounted display may include a first (e.g., for left eye) display system 605 and a second (e.g., for right eye) display system 605 where the diffractive elements 600 of the first and second display systems differ from one another so that, for example, for at least one wavelength, the diffractive elements have at least one different corresponding diffractive property as described further elsewhere herein.

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 5 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.95 and 1.05, and that the value could be 1.

The follow is a list of illustrative embodiments of the present description.

Embodiment 1 is a head-mounted display including:
two-dimensionally pixelated adjacent first and second display surfaces for displaying images; and first and second diffractive elements disposed adjacent the respective first and second display surfaces. The first diffractive element is configured to diffract a first wavelength $\lambda 1$, but not a different second wavelength $\lambda 2$, into zero and first diffraction orders having intensities within 5% of each other, and the second diffractive element is configured to diffract the second wavelength $\lambda 2$, but not the first wavelength $\lambda 1$, into zero and first diffraction orders having intensities within 5% of each other.

Embodiment 2 is the head-mounted display of Embodiment 1, where $\lambda 1$ is in a range of 480 nm 580 nm and $\lambda 2$ is in a range of 600 nm 700 nm.

Embodiment 3 is the head-mounted display of Embodiment 1, where 25 nm$\leq \lambda 2 - \lambda 1 \leq$250 nm, or 50 nm$\leq \lambda 2 - \lambda 1 \leq$200 nm.

Embodiment 4 is the head-mounted display of any one of Embodiments 1 to 3, where the first diffractive element includes a first grating interface and the second diffractive element includes a second grating interface, an absolute value of an average refractive index difference across the first grating interface being $\Delta n_1$, the first grating interface having an average grating height H1, an absolute value of an average refractive index difference across the second grating interface being $\Delta n_2$, the second grating interface having an average grating height H2, where at the first wavelength $\lambda 1$, $\Delta n_1 *H1$ is in a range of 0.2 micrometers to 0.35 micrometers, and at the second wavelength $\lambda 2$, $\Delta n_2 *H2$ is in a range of 0.2 micrometers to 0.35 micrometers, $\Delta n_2 *H2 > \Delta n_1 *H1$.

Embodiment 5 is the head-mounted display of Embodiment 4, where 120 nm$>\Delta n_2 *H2-\Delta n_1 *H1>$10 nm.

Embodiment 6 is the head-mounted display of any one of Embodiments 1 to 5, where the first diffractive element is configured to diffract the second wavelength $\lambda 2$ into zero and first diffraction orders such that intensities of the zero order and at least one of the first diffraction orders diffracted by the first diffractive element at the second wavelength $\lambda 2$ differ by at least 10% from each other, and the second diffractive element is configured to diffract the first wavelength $\lambda 1$ into zero and first diffraction orders such that intensities of the zero order and at least one of the first diffraction orders diffracted by the second diffractive element at the first wavelength $\lambda 1$ differ by at least 10% from each other.

Embodiment 7 is the head-mounted display of any one of Embodiments 1 to 6, where the first diffractive element includes a repeating pattern of first shapes and the second diffractive element includes a repeating pattern of second shapes, the first and second shapes having different geometries.

Embodiment 8 is the head-mounted display of any one of Embodiments 1 to 6, where the first diffractive element includes a first plurality of microlenses and the second diffractive element includes a second plurality of microlenses, the first and second pluralities of microlenses differing from one another by at least one of a height of the microlenses, a curvature of the microlenses, a center-to-center distance between adjacent microlenses, a gap between adjacent microlenses, or a refractive index of the microlenses.

Embodiment 9 is a head-mounted display including:
pixelated first and second display surfaces; and
non-overlapping first and second diffractive elements substantially co-extensive with the respective first and second display surfaces. For at least one wavelength, the first and second diffractive elements have at least one different corresponding diffractive property.

Embodiment 10 is the head-mounted display of Embodiment 9, where the at least one diffractive property includes relative intensities of zero and first diffraction orders.

Embodiment 11 is the head-mounted display of Embodiment 9 being further characterized by any one of Embodiments 1 to 8.

Embodiment 12 is a head-mounted display including:
left and right pixelated display surfaces for displaying images to respective left and right eyes of a viewer; and left and right grating surfaces substantially co-extensive with the respective left and right display surfaces. For at least one wavelength, the first and second grating surfaces have at least one different corresponding diffractive property.

Embodiment 13 is the head-mounted display of Embodiment 12, where the at least one diffractive property includes relative intensities of zero and first diffraction orders.

Embodiment 14 is the head-mounted display of Embodiment 12, where each grating surface diffracts a first wavelength into zero and first diffraction orders having intensities within 10% of each other, the first wavelength for the left grating surface different than the first wavelength for the right grating surface by at least 50 nm.

Embodiment 15 is the head-mounted display of Embodiment 14, where the first wavelength for one of the left and right grating surfaces is in a range of 480 nm 580 nm and the first wavelength for the other of the left and right grating surfaces is in a range of 600 nm 700 nm.

Embodiment 16 is the head-mounted display of Embodiment 14, where a left grating interface includes the left grating surface, an absolute value of an average refractive index difference across the left grating interface being $\Delta n_1$, the left grating interface having an average grating height H1; and a right grating interface includes the right grating surface, an absolute value of a refractive index difference across the right grating interface being $\Delta n_2$, the right grating interface having an average grating height H2, where at the first wavelength for the left grating surface, $\Delta n_1 *H1$ is in a range of 0.2 micrometers to 0.35 micrometers, and at the first wavelength for the right grating surface, $\Delta n_2*H2$ is in a range of 0.2 micrometers to 0.35 micrometers.

Embodiment 17 is the head-mounted display of Embodiment 14, where the right grating surface diffracts the first wavelength for the left grating surface into a zero and first diffraction orders having intensities differing by at least 20% from each other, and the left grating surface diffracts the first wavelength for the right grating surface into a zero and first diffraction orders having intensities differing by at least 20% from each other.

Embodiment 18 is the head-mounted display of any one of Embodiments 12 to 17, where each of the left and right display surfaces include a plurality of pixels, each pixel including a plurality of subpixels, the left and right grating surfaces diffracting at least one subpixel in each pixel of the respective left and right display surfaces into a zero order diffracted subpixel and a plurality of first order diffracted subpixels, the head-mounted display being configured to image each zero order diffracted subpixel onto an image surface as an imaged subpixel and to image each first order diffracted subpixel onto the image surface as an imaged duplicate subpixel such that for each imaged subpixel, a center-to-center distance between the imaged subpixel and a nearest adjacent imaged duplicate subpixel is in a range of 0.1 to 0.9 times than a center-to-center distance between the imaged subpixel and a nearest adjacent imaged subpixel.

Embodiment 19 is a head-mounted display including:
a first display surface for displaying an image;
a second display surface for displaying an image, the second display surface disposed proximate the first display surface;
a first multilayer optical film disposed adjacent the first display surface and including first and second optical layers defining a two-dimensional first grating interface therebetween, the first and second optical layers having respective different first and second refractive indices n1 and n2, the first grating interface having a grating height h1, where at a reference wavelength $\lambda$, the first multilayer optical film has an average value of $|n1-n2|*h1$ being $\mu 1$ and a standard deviation of $|n1-n2|*h1$ being $\sigma 1$; and
a second multilayer optical film disposed adjacent the second display surface and including third and fourth optical layers defining a two-dimensional second grating interface therebetween, the third and fourth optical layers having respective different third and fourth refractive indices n3 and n4, the second grating interface having a grating height h2, where at the reference wavelength $\lambda$, the second multilayer optical film has an average value of $|n3-n4|*h2$ being $\mu 2$ and a standard deviation of $|n3-n4|*h2$ being $\sigma 2$. $|1-\mu 2|>\sigma 1+\sigma 2$.

Embodiment 20 is the head-mounted display of Embodiment 19, where 200 nm>$|\mu 1-\mu 2|$>10 nm, or 120 nm>$|\mu 1-\mu 2|$>20 nm, or 90 nm>$|\mu 1-\mu 2|$>25 nm.

Embodiment 21 is the head-mounted display of Embodiment 19, where $\sigma 1$<0.1 $\mu 1$ and $\sigma 2$<0.1 $\mu 2$.

Embodiment 22 is the head-mounted display of Embodiment 19, where $|\mu 1-\mu 2|>2(\sigma 1+\sigma 2)$, or $|\mu 1-\mu 2|>4 (\sigma 1+\sigma 2)$, or $|\mu 1-\mu 2|>8 (\sigma 1+\sigma 2)$.

Embodiment 23 is the head-mounted display of Embodiment 19, where the first grating interface is configured to diffract a first wavelength $\lambda 1$, but not a different second wavelength $\lambda 2$, into zero and first diffraction orders having intensities within 5% of each other, and the second grating interface is configured to diffract the second wavelength $\lambda 2$, but not the first wavelength $\lambda 1$, into zero and first diffraction orders having intensities within 5% of each other.

Embodiment 24 is a headset including:
a first diffractive element;
a first optical system, the first diffractive element disposed to receive a first image and transmit the first image to the first optical system, the first optical system configured to transmit the first image to a viewer;
a second diffractive element disposed proximate the first diffractive element; and
a second optical system, the second diffractive element disposed to receive a second image and transmit the second image to the second optical system, the second optical system configured to transmit the second image to the viewer. For at least one wavelength, the first and second diffractive elements have at least one different corresponding diffractive property.

EXAMPLES

Example 1

Two multilayer optical films were prepared as follows. Base films were made via microreplication as follows. A two-dimensional sine wave having a pitch of 24 micrometers and a grating height of 2.4 micrometers was cut into a copper tool using diamond turning as described, for example, in PCT Published Application No. WO 00/48037 (Campbell et al.), and U.S. Pat. No. 7,350,442 (Ehnes et al.) and U.S. Pat. No. 7,328,638 (Gardiner et al.). The tool was used to microreplicate the sine wave grating onto a UV-cured acrylate layer on a 3 mil primed polyethylene terephthalate (PET) film using a cast-and-cure process as described, for example, in U.S. Pat. No. 5,75,030 (Lu et al.) and U.S. Pat. No. 5,183,597 (Lu). The UV-cured acrylate layer had a refractive index of 1.57 at a wavelength of 532 nm.

A first multilayer optical film was made by coating and then curing 3M Optically Clear Adhesive 8146 (available from 3M Company, St. Paul, Minn.) on the microstructures of one of the base films at a thickness of 25 micrometers. The refractive index of the cured optically clear adhesive was 1.47 at a wavelength of 532 nm.

A second multilayer optical film was made by coating and then curing a different optically clear adhesive on the microstructures of another one of the base films at a thickness of 25 micrometers. The refractive index of the cured optically clear adhesive was 1.45 at a wavelength of 532 nm.

The first and second films were laminated to the cover glass of a Samsung Galaxy S® 6 smart phone with each film covering about half of the phone's display. The phone was then placed in a Samsung Gear VR headset. When viewed one eye at a time through the Samsung Gear VR, the first multilayer optical film was found to provide a closer match in intensities for zero and first diffraction orders for green subpixels than for red subpixels, and the second multilayer optical film was found to provide a closer match in intensities for zero and first diffraction orders for red subpixels than for green subpixels. For comparisons, a sample of the first film was laminated to the cover glass of a Samsung Galaxy S® 6 smart phone covering substantially all of the phone's display and a sample of the second film was laminated to the cover glass of a Samsung Galaxy S® 6 smart phone covering substantially all of the phone's display. When viewed through the Samsung Gear VR headset, the phone with the first film showed bright spots for the red subpixel without a substantially reduced screen door effect for red colors. When viewed through the Samsung Gear VR headset, the phone with the second film showed reduced intensity of zero diffraction orders for green subpixels, which resulted in objectionable nonuniformity for green colors, and showed very low intensity of zero diffraction order for blue subpixels resulting in nonuniformity in for blue colors and showed increased second diffraction orders for blue subpixels resulting in reduced resolution for blue colors. When the phone including both first and second films was viewed through the Samsung Gear VR headset, a significant reduction in the screen door effect for red, green and blue colors was perceived without a perceived loss in resolution.

Example 2

One-dimensional grating interfaces were modeled. A first grating interface had a refractive index contrast (|n1−n2|) of 0.1, a grating height of 2.4 micrometers, and a pitch of 24 micrometers. A second grating interface had a refractive index contrast (|n3−n4|) of 0.126, a grating height of 2.4 micrometers, and a pitch of 24 micrometers. The index contrasts were modeled as being independent of wavelength.

Figure 15A:
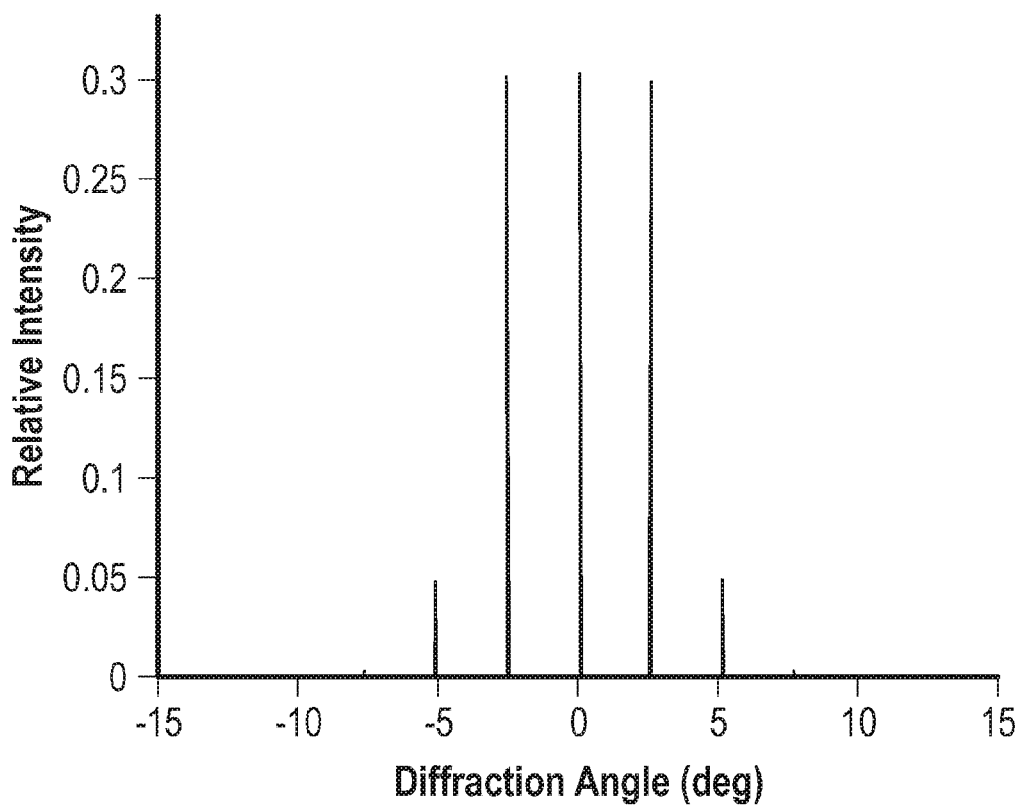
FIGS. 15A-16B are plots of relative intensities of various diffraction peaks produced by grating interfaces.
Figure 15B:
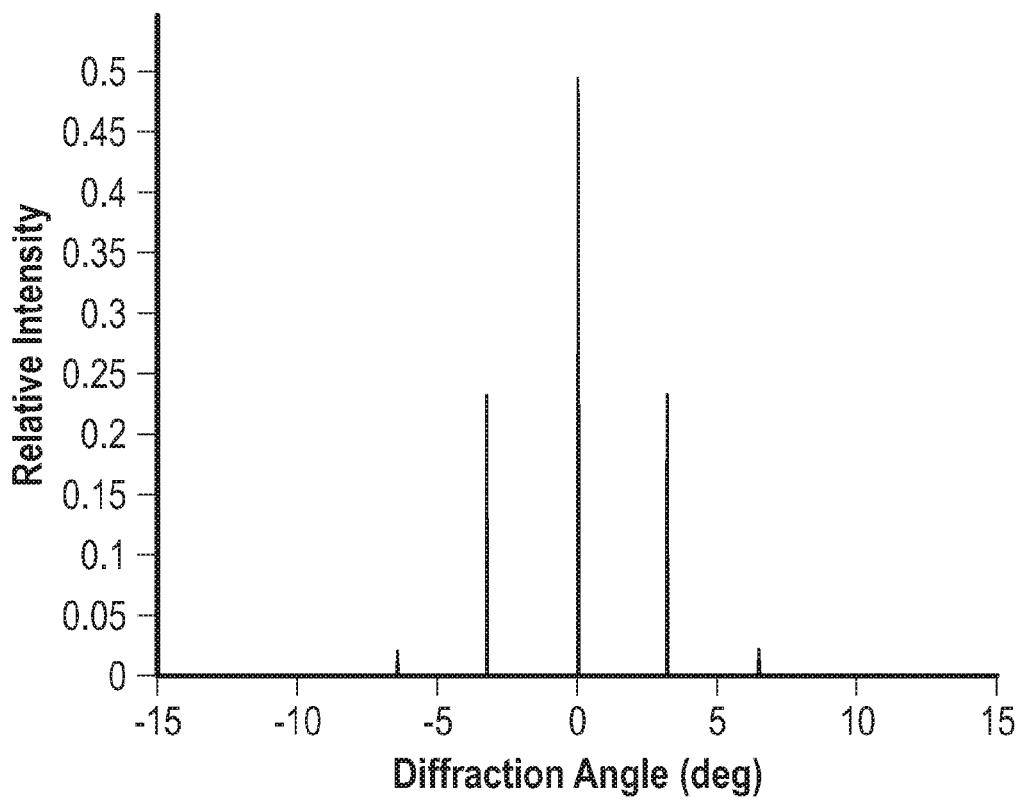

The relative intensities of various diffraction orders produced by the first grating interface at 535 nm and 675 nm wavelengths are shown in FIGS. 15A and 15B, respectively. At 535 nm the zero diffraction order (at a diffraction angle of 0 degrees) and the first diffraction orders (at diffraction angles of about ±2.5 degrees) had approximately equal intensities while the higher diffraction orders has much lower intensities. At 675 nm, the zero diffraction order had an intensity about twice that of the first diffraction orders.

Figure 16A:
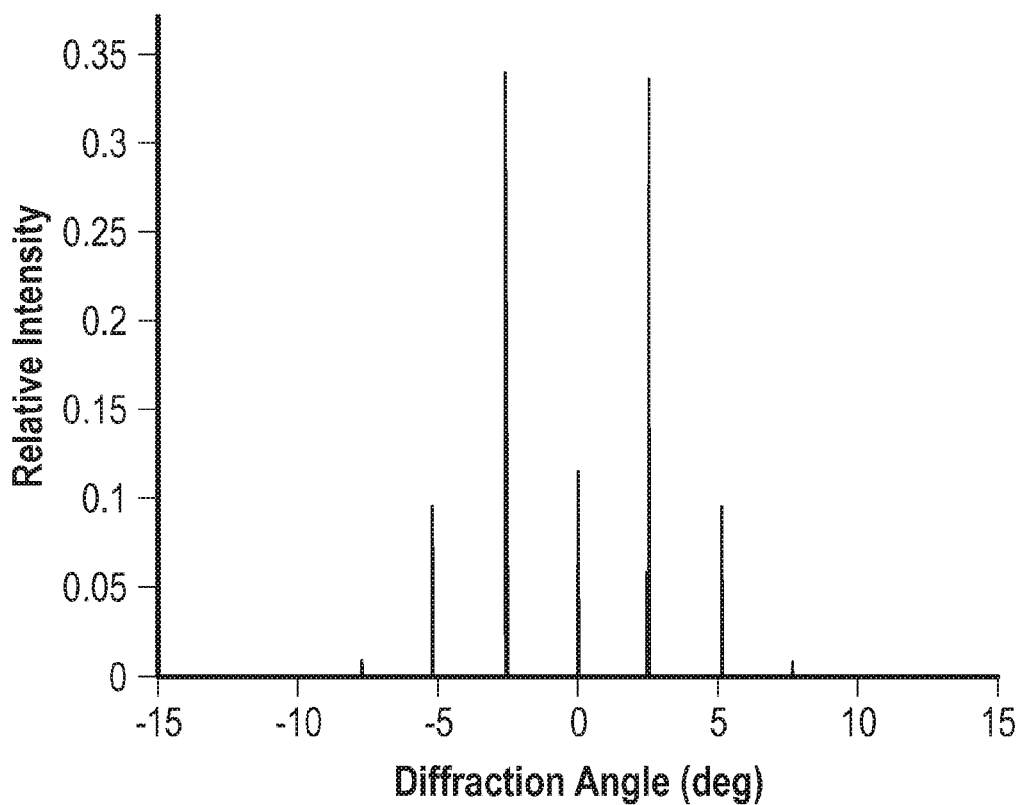
Figure 16B:
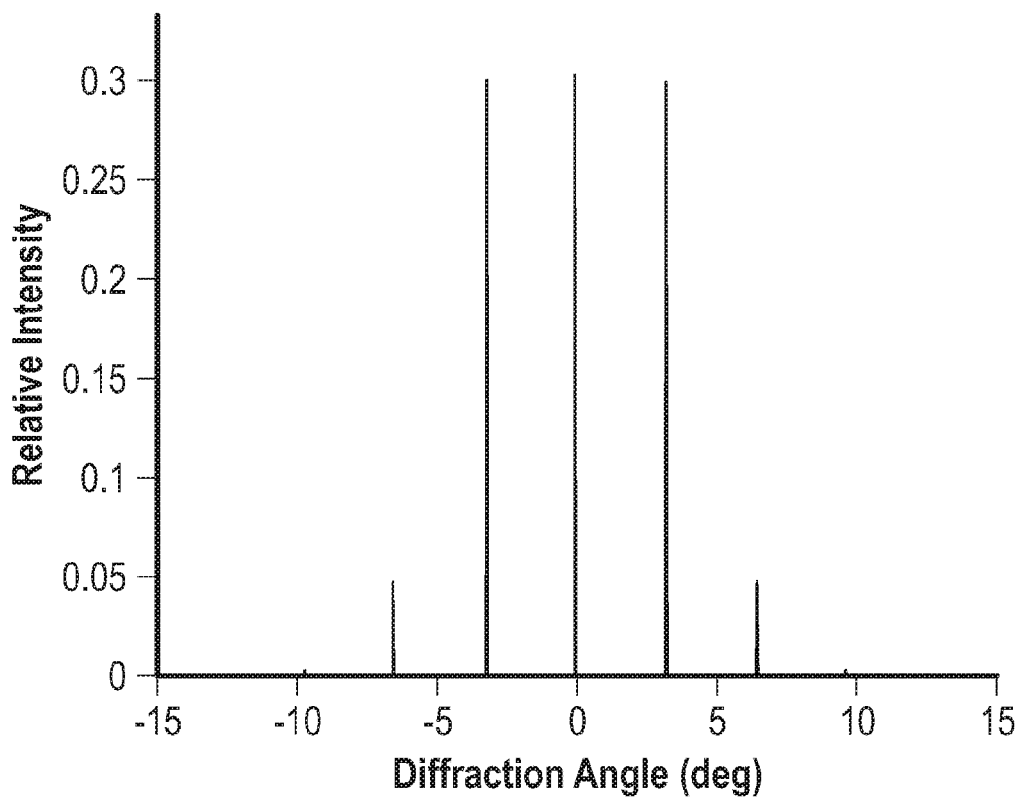

The relative intensities of various diffraction orders produced by the second grating interface at 535 nm and 675 nm wavelengths are shown in FIGS. 16A and 16B, respectively. At 675 nm, the zero diffraction order (at a diffraction angle of 0 degrees) and the first diffraction orders (at diffraction angles of about ±3 degrees) had approximately equal intensities while the higher diffraction orders has much lower intensities. At 535 nm, the zero diffraction order had an intensity about a third that of the first diffraction orders.

Example 3

A two-dimensional grating surface including microlenses arranged on a triangular lattice as depicted in FIG. 6 was modeled. The diffraction pattern appeared generally as depicted in FIG. 11 with higher order diffraction peaks having relative low intensities. The grating geometry and refractive index contrast was selected such that the zero and first diffraction orders had approximately equal zero and first order intensities at a wavelength of 600 nm. At 600 nm, the diffraction efficiency (percent of incident energy diffracted into a specified diffraction order) of the zero diffraction order was 7.6% and the diffraction efficiency was 7.7% for each of the six first diffraction orders. Six second diffraction order peaks had diffraction efficiencies of 3.8% each and higher diffraction orders having lower diffraction efficiencies were also produces. At 588 nm, the diffraction efficiency of the zero diffraction order was 6.6% and the diffraction efficiency was 7.5% for each of the six first diffraction orders. At 612 nm, the diffraction efficiency of the zero diffraction order was 8.7% and the diffraction efficiency was 7.8% for each of the six first diffraction orders.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A head-mounted display comprising:
two-dimensionally pixelated adjacent first and second display surfaces for displaying images; and
first and second diffractive elements disposed adjacent the respective first and second display surfaces,
wherein the first diffractive element is configured to diffract a first wavelength $\lambda 1$, but not a different second wavelength $\lambda 2$, into zero and first diffraction orders having intensities within 5% of each other, and the second diffractive element is configured to diffract the second wavelength $\lambda 2$, but not the first wavelength $\lambda 1$, into zero and first diffraction orders having intensities within 5% of each other.

2. The head-mounted display of claim 1, wherein $\lambda 1$ is in a range of 480 nm-580 nm and $\lambda 2$ is in a range of 600 nm-700 nm.

3. The head-mounted display of claim 1, wherein 25 nm≤$\lambda 2-\lambda 1$≤250 nm.

4. The head-mounted display of claim 1, wherein the first diffractive element comprises a first grating interface and the second diffractive element comprises a second grating interface, an absolute value of an average refractive index difference across the first grating interface being $\Delta n_1$, the first grating interface having an average grating height H1, an absolute value of an average refractive index difference across the second grating interface being $\Delta n_2$, the second grating interface having an average grating height H2, wherein at the first wavelength $\lambda 1$, $\Delta n_1$*H1 is in a range of 0.2 micrometers to 0.35 micrometers, and at the second wavelength $\lambda 2$, $\Delta n_2$*H2 is in a range of 0.2 micrometers to 0.35 micrometers, $\Delta n_2$*H2>$\Delta n_1$*H1.

5. The head-mounted display of claim 4, wherein 120 nm>$\Delta n_2$*H2−$\Delta n_1$*H1>10 nm.

6. The head-mounted display of claim 1, wherein the first diffractive element is configured to diffract the second wavelength $\lambda 2$ into zero and first diffraction orders such that intensities of the zero order and at least one of the first diffraction orders diffracted by the first diffractive element at the second wavelength $\lambda 2$ differ by at least 10% from each other, and the second diffractive element is configured to diffract the first wavelength $\lambda 1$ into zero and first diffraction orders such that intensities of the zero order and at least one of the first diffraction orders diffracted by the second diffractive element at the first wavelength $\lambda 1$ differ by at least 10% from each other.

7. The head-mounted display of claim 1, wherein the first diffractive element comprises a repeating pattern of first shapes and the second diffractive element comprises a repeating pattern of second shapes, the first and second shapes having different geometries.

8. The head-mounted display of claim 1, wherein the first diffractive element comprises a first plurality of microlenses and the second diffractive element comprises a second plurality of microlenses, the first and second pluralities of microlenses differing from one another by at least one of a height of the microlenses, a curvature of the microlenses, a center-to-center distance between adjacent microlenses, a gap between adjacent microlenses, or a refractive index of the microlenses.

9. A head-mounted display comprising:
pixelated first and second display surfaces; and
non-overlapping first and second diffractive elements substantially co-extensive with the respective first and second display surfaces,
wherein each of the first and second diffractive elements diffracts a first wavelength into zero and first diffraction orders having intensities within 10% of each other, the first wavelength for the first diffractive element different than the first wavelength for the second diffractive element by at least 50 nm.

10. The head-mounted display of claim 9, wherein the second diffractive element diffracts the first wavelength for the first diffractive element into a zero and first diffraction orders having intensities differing by at least 20% from each other, and the first diffractive element diffracts the first wavelength for the second diffractive element into a zero and first diffraction orders having intensities differing by at least 20% from each other.

11. The head-mounted display of claim 9, wherein the first and second display surfaces comprise respective left and right pixelated display surfaces for displaying images to respective left and right eyes of a viewer; and the first and second diffractive elements comprise respective left and right grating surfaces substantially co-extensive with the respective left and right display surfaces.

12. The head-mounted display of claim 11, wherein each of the left and right grating surfaces diffracts the first wavelength of the respective first and second diffractive elements into the zero and first diffraction orders having intensities within 10% of each other, the first wavelength for the first diffractive element different than the first wavelength for the second diffractive element by at least 75 nm.

13. The head-mounted display of claim 12, wherein the right grating surface diffracts the first wavelength for the first diffractive element into a zero and first diffraction orders having intensities differing by at least 20% from each other, and the left grating surface diffracts the first wavelength for the second diffractive element into a zero and first diffraction orders having intensities differing by at least 20% from each other.

14. A head-mounted display comprising:
a first display surface for displaying an image;
a second display surface for displaying an image, the second display surface disposed proximate the first display surface;
a first multilayer optical film disposed adjacent the first display surface and comprising first and second optical layers defining a two-dimensional first grating interface therebetween, the first and second optical layers having respective different first and second refractive indices n1 and n2, the first grating interface having a grating height h1, wherein at a reference wavelength $\lambda$, the first multilayer optical film has an average value of $|n1-n2|*h1$ being $\mu 1$ and a standard deviation of $|n1-n2|*h1$ being $\sigma 1$; and
a second multilayer optical film disposed adjacent the second display surface and comprising third and fourth optical layers defining a two-dimensional second grating interface therebetween, the third and fourth optical layers having respective different third and fourth refractive indices n3 and n4, the second grating interface having a grating height h2, wherein at the reference wavelength $\lambda$, the second multilayer optical film has an average value of $|n3-n4|*h2$ being $\mu 2$ and a standard deviation of $|n3-n4|*h2$ being $\sigma 2$,
wherein $|\mu 1-\mu 2|>\sigma 1+\sigma 2$.

15. The head-mounted display of claim 14, wherein 200 nm>$|\mu 1-\mu 2|$>10 nm.

16. A headset comprising:
a first diffractive element;
a first optical system, the first diffractive element disposed to receive a first image and transmit the first image to the first optical system, the first optical system configured to transmit the first image to a viewer;
a second diffractive element disposed proximate the first diffractive element; and
a second optical system, the second diffractive element disposed to receive a second image and transmit the second image to the second optical system, the second optical system configured to transmit the second image to the viewer,
wherein the first diffractive element is configured to diffract a first wavelength $\lambda 1$, but not a different second wavelength $\lambda 2$, into zero and first diffraction orders having intensities within 5% of each other, and the second diffractive element is configured to diffract the second wavelength $\lambda 2$, but not the first wavelength $\lambda 1$, into zero and first diffraction orders having intensities within 5% of each other.

17. The headset of claim 16, wherein $\lambda 1$ is in a range of 480 nm-580 nm and $\lambda 2$ is in a range of 600 nm-700 nm.

18. The headset of claim 16,
wherein the first diffractive element comprises a first multilayer optical film comprising first and second optical layers defining a two-dimensional first grating interface therebetween, the first and second optical layers having respective different first and second refractive indices n1 and n2, the first grating interface having a grating height h1, wherein at a reference wavelength $\lambda$, the first multilayer optical film has an average value of $|n1-n2|*h1$ being $\mu 1$ and a standard deviation of $|n1-n2|*h1$ being $\sigma 1$;
wherein the second diffractive element comprises a second multilayer optical film comprising third and fourth optical layers defining a two-dimensional second grating interface therebetween, the third and fourth optical layers having respective different third and fourth refractive indices n3 and n4, the second grating interface having a grating height h2, wherein at the reference wavelength $\lambda$, the second multilayer optical film has an average value of $|n3-n4|*h2$ being $\mu 2$ and a standard deviation of $|n3-n4|*h2$ being $\sigma 2$; and
wherein $|\mu 1-\mu 2|>\sigma 1+\sigma 2$.

19. A headset comprising:
a first diffractive element;
a first optical system, the first diffractive element disposed to receive a first image and transmit the first image to the first optical system, the first optical system configured to transmit the first image to a viewer;
a second diffractive element disposed proximate the first diffractive element; and
a second optical system, the second diffractive element disposed to receive a second image and transmit the second image to the second optical system, the second optical system configured to transmit the second image to the viewer,
wherein the first diffractive element comprises a first multilayer optical film comprising first and second optical layers defining a two-dimensional first grating interface therebetween, the first and second optical layers having respective different first and second refractive indices n1 and n2, the first grating interface having a grating height h1, wherein at a reference wavelength λ, the first multilayer optical film has an average value of |n1−n2|*h1 being μ1 and a standard deviation of |n1−n2|*h1 being σ1;

wherein the second diffractive element comprises a second multilayer optical film comprising third and fourth optical layers defining a two-dimensional second grating interface therebetween, the third and fourth optical layers having respective different third and fourth refractive indices n3 and n4, the second grating interface having a grating height h2, wherein at the reference wavelength λ, the second multilayer optical film has an average value of |n3−n4|*h2 being μ2 and a standard deviation of |n3−n4|*h2 being σ2; and wherein |μ1−μ2|>σ1+σ2.

20. The headset of claim 19, wherein 200 nm>|μ1−μ2|>10 nm.

\* \* \* \* \*